US009919753B2

(12) United States Patent
Jacobsen et al.

(10) Patent No.: US 9,919,753 B2
(45) Date of Patent: Mar. 20, 2018

(54) ROBOTIC MOBILE LOW-PROFILE TRANSPORT VEHICLE

(71) Applicant: Sarcos LC, Salt Lake City, UT (US)

(72) Inventors: Stephen C. Jacobsen, Salt Lake City, UT (US); Marc X. Olivier, Salt Lake City, UT (US); John McCullough, Salt Lake City, UT (US); Fraser M. Smith, Salt Lake City, UT (US)

(73) Assignee: Sarcos LC, Salt Lake City, UT (US)

( * ) Notice: Subject to any disclaimer, the term of this patent is extended or adjusted under 35 U.S.C. 154(b) by 0 days.

(21) Appl. No.: 15/061,914

(22) Filed: Mar. 4, 2016

(65) Prior Publication Data

US 2017/0021881 A1    Jan. 26, 2017

Related U.S. Application Data

(63) Continuation of application No. 14/188,628, filed on Feb. 24, 2014, now Pat. No. 9,403,566, which is a
(Continued)

(51) Int. Cl.
*B62D 59/04* (2006.01)
*B62D 37/04* (2006.01)
(Continued)

(52) U.S. Cl.
CPC ............ *B62D 59/04* (2013.01); *B62D 37/04* (2013.01); *B62D 55/0655* (2013.01); *F41H 7/005* (2013.01)

(58) Field of Classification Search
CPC .... B62D 59/04; B62D 37/04; B62D 55/0655; F41H 7/005
See application file for complete search history.

(56) References Cited

U.S. PATENT DOCUMENTS

| 4,046,262 A | 9/1977 | Vykukal et al. |
| 4,762,455 A | 8/1988 | Coughlan et al. |

(Continued)

FOREIGN PATENT DOCUMENTS

| DE | 20314213 U1 | 11/2003 |
| DE | 102006054149 A1 | 5/2008 |

(Continued)

OTHER PUBLICATIONS

Jacobsen; Science, Robotics, and Superheroes; Presented at University of Utah's Science at Breakfast, Mar. 17, 2010; 16 pages.
(Continued)

*Primary Examiner* — Tony H Winner
*Assistant Examiner* — Marlon A Arce

(57) ABSTRACT

A robotic mobile low-profile transport vehicle is disclosed. The vehicle can comprise a first transport module having a frame assembly, a mobility system, and a propulsion system and a second transport module having a frame assembly and a mobility system. A multi-degree of freedom coupling assemblage can join the first and second transport modules together. The vehicle can include a first platform supported about the frame assembly of the first transport module, and a second platform supported about the frame assembly of the second transport module. Each of the platforms can be configured to receive a load for transport. Additionally, the vehicle can include a control system that can operate to facilitate intra-module communication and coordination to provide a coordinated operating mode of the first and second transport modules and the coupling assemblage about a given terrain.

23 Claims, 17 Drawing Sheets

Related U.S. Application Data continuation of application No. 14/005,524, filed as application No. PCT/US2012/029385 on Mar. 16, 2012.

(60) Provisional application No. 61/453,878, filed on Mar. 17, 2011.

(51) Int. Cl.
*B62D 55/065* (2006.01)
*F41H 7/00* (2006.01)

(56) References Cited

U.S. PATENT DOCUMENTS

| | | | |
|---|---|---|---|
| 4,799,849 A | 1/1989 | Miller | |
| 4,883,400 A | 11/1989 | Kuban et al. | |
| 5,105,367 A | 4/1992 | Tsuchihashi et al. | |
| 5,127,697 A | 7/1992 | St Marie | |
| 5,845,540 A | 12/1998 | Rosheim | |
| 6,301,526 B1 | 10/2001 | Kim et al. | |
| 6,484,083 B1 | 11/2002 | Hayward et al. | |
| 6,507,163 B1 | 1/2003 | Allen | |
| 7,410,338 B2 | 8/2008 | Schiele et al. | |
| 7,578,383 B2* | 8/2009 | Itoh | G01N 35/04 198/468.01 |
| 7,783,384 B2 | 8/2010 | Kraft | |
| 7,946,372 B2 | 5/2011 | Shraga et al. | |
| 9,004,260 B2* | 4/2015 | Li | B65G 35/06 198/468.2 |
| 9,376,158 B1* | 6/2016 | McCormick | |
| 2004/0216932 A1 | 11/2004 | Giovanetti et al. | |
| 2005/0230557 A1 | 10/2005 | Aghili | |
| 2008/0093131 A1 | 4/2008 | Couture et al. | |
| 2010/0201185 A1 | 8/2010 | Jacobsen et al. | |
| 2014/0343728 A1 | 11/2014 | Jun et al. | |

FOREIGN PATENT DOCUMENTS

| | | |
|---|---|---|
| EP | 0616275 | 9/1994 |
| WO | WO 2007/057904 A1 | 5/2007 |
| WO | WO 2009/078940 A1 | 6/2009 |

OTHER PUBLICATIONS

Kim et al; A Force Reflected Exoskeleton-Type Masterarm for Human-Robot Interaction; IEEE Transactions on Systems, Man and Cybertentics-Part A: Systems and Humans; Mar. 2005; pp. 198-212; vol. 35, No. 2.

Song et al; Kinematics Analysis and Implementation of a Motion-Following Task for a Humanoid Slave Robot Controlled by an Exoskeleton Master Robot; International Journal of Control, Automation and Systems; Dec. 2007; pp. 681-690; vol. 5, No. 6.

* cited by examiner

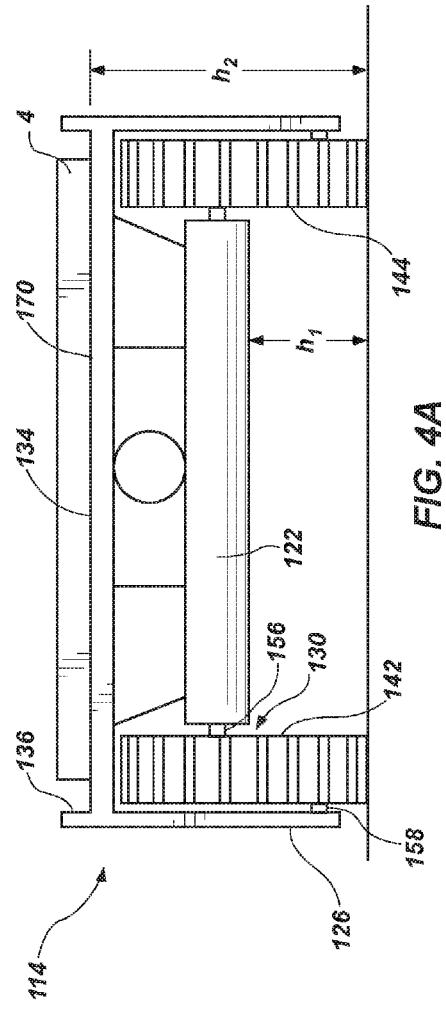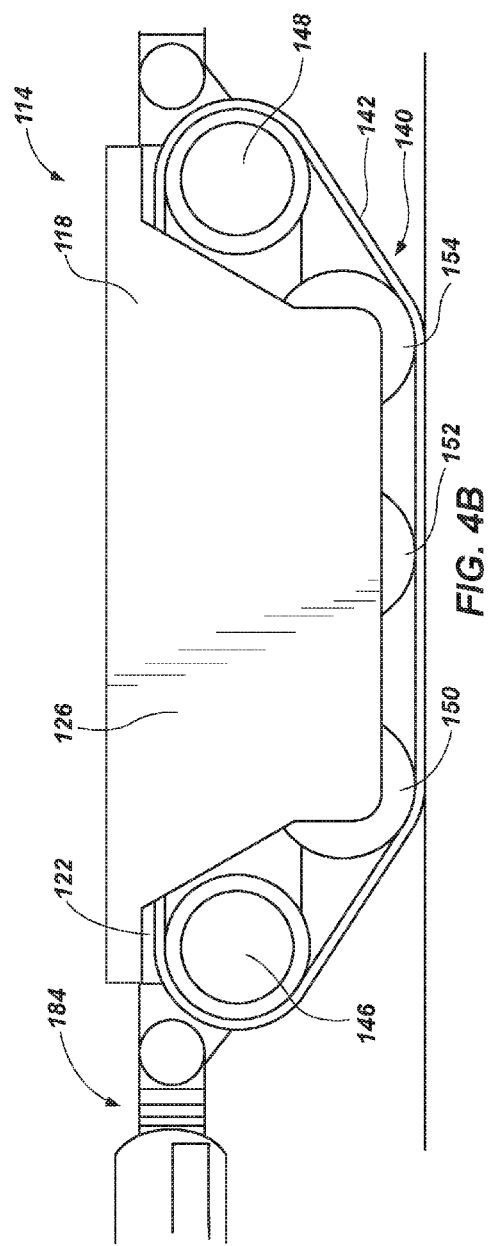

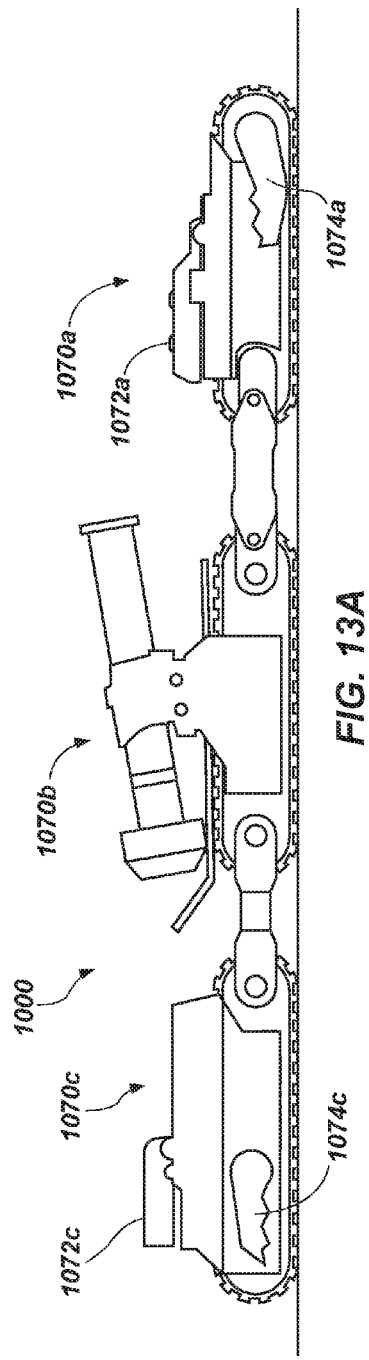
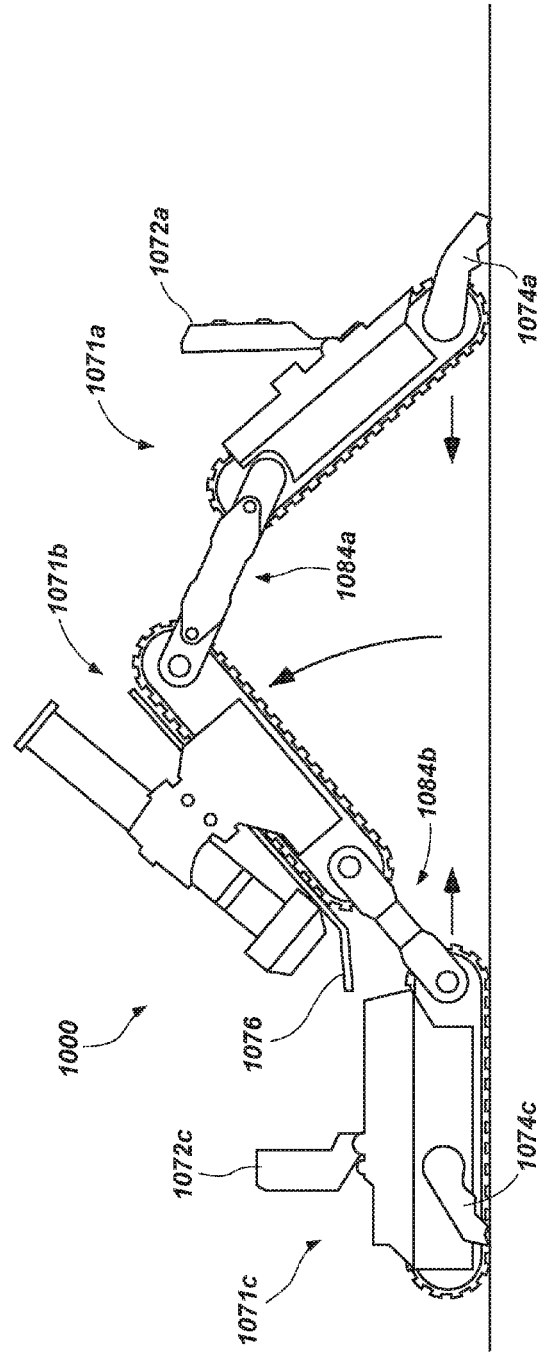
FIG. 13A
FIG. 13B

US 9,919,753 B2

ROBOTIC MOBILE LOW-PROFILE TRANSPORT VEHICLE

RELATED APPLICATIONS

This application is a continuation of U.S. application Ser. No. 14/188,628 filed Feb. 24, 2014, which is a continuation of U.S. application Ser. No. 14/005,524, filed Sep. 16, 2013, which was the National Stage of International Application No. PCT/US12/29385, filed Mar. 16, 2012, which claims the benefit of U.S. Provisional Application No. 61/453,878, filed Mar. 17, 2011, each of which is incorporated by reference herein in their entirety.

FIELD OF THE INVENTION

The present invention relates generally to robotic systems and devices, and more particularly to mobile robotic vehicles.

BACKGROUND

Lifting and transporting objects and items from place to place often presents considerable problems in terms of not being safe, efficient and/or cost effective. These problems can be exacerbated in those industries and environments where a part of or all of the lifting and transporting of objects or items is required to be done manually due to the unavailability of lift or transport assistance mechanisms.

One illustrative situation is military logistics, sometimes referred to as combat service support, which comprises the discipline of carrying out the movement, maintenance and support of military forces. Along with the transport of military personnel, and although more comprehensive overall, military logistics includes the aspect of acquisition, storage, distribution, transport, maintenance, evacuation, and preparation of material and equipment Logistics support is grouped into various Classes, with Classes III, V, VII and IX comprising equipment that can weigh up to several hundred pounds or more. In the case of Class V equipment, this includes ammunition, bombs, explosives, missiles, rockets and other similar items that pose significant logistics problems in terms of lifting and transporting these items. Moving these about requires great effort on the part of logistics support personnel, even with the help of the limited assistance mechanisms made available to them. Even items in other Classes that weigh much less than those in Class V can pose problems due to the number of items that can be required to be handled on a daily basis. It is not uncommon for logistics support personnel to each lift and transport several thousand pounds a day, sometimes over difficult terrain. Moreover, much of this is done manually, unfortunately leading to a variety of orthopedic and other injuries.

SUMMARY OF THE INVENTION

In light of the problems and deficiencies inherent in the prior art, the present invention seeks to overcome these by providing a robotic mobile low-profile transport vehicle configured to carry heavy loads over uneven or complex terrain, and to achieve and maintain an operating configuration to traverse the terrain in an efficient manner.

In accordance with one exemplary embodiment, the present invention resides in a robotic mobile low-profile transport vehicle, comprising a first transport module having a frame assembly, a mobility system, and a propulsion system; a second transport module having a frame assembly and a mobility system; a multi-degree of freedom coupling assemblage joining said first and second transport modules together; a first platform supported about said frame assembly of said first transport module, and a second platform supported about said frame assembly of said second transport module, each of said platforms being configured to receive a load for transport; and a control system that operates to facilitate intra-module communication and coordination to provide a coordinating operating mode of said first and second transport modules and said coupling assemblage about a given terrain.

In accordance with another exemplary embodiment, the present invention resides in a robotic transport module operable within a mobile low-profile transport vehicle, said transport module comprising a frame assembly; a mobility system supported about said frame assembly, and configured to facilitate movement of said transport module; a platform configured to receive a load, said platform being supported by and moveable about said frame assembly; and a translation system configured to facilitate active, actuated translation of said platform in at least one degree of freedom about said frame assembly, wherein said translation system operates to alter a center of mass of said transport module to enhance stability of said transport module during operation.

In accordance with yet another exemplary embodiment, the present invention resides in a robotic transport module operable within a mobile low-profile transport vehicle, said transport module comprising a frame assembly; a mobility system supported about said frame assembly, and configured to provide movement to said transport module; and an interchangeable payload system, comprising a payload module; and an interchange interface that operates to facilitate removable coupling of the payload module with the transport module.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings.

FIG. 4A illustrates an end view of a transport module formed in accordance with one exemplary embodiment of the present invention, wherein the transport module comprises a two track design.

FIG. 4B illustrates a side view of the transport module of FIG. 4A.

FIG. 13A illustrates a robotic mobile low-profile transport vehicle configured for missile launch operations in accordance with an exemplary embodiment of the present invention.

FIG. 13B illustrates the robotic mobile low-profile transport vehicle of FIG. 13A in a missile launch configuration.

DETAILED DESCRIPTION

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only to describe the features and characteristics of the present invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

Described herein is a robotic mobile low-profile transport vehicle, which may be specifically configured for transporting heavy or "human-scale" payloads (e.g. equipment, munitions, weapons, supplies, individuals, etc.). This can be done at high speed, if desired, and in complex terrains, such as undulating or rocky terrain, steep hills, narrow tortuous paths, urban environments, inside buildings and other structures, etc. In some embodiments, the robotic mobile low-profile transport vehicle is designed to continually configure or position itself in the most optimal operating position (in terms of traversing a particular terrain, path, obstacle, etc.) by continually monitoring various aspects of the several vehicle components and the operating environment, and making any necessary or available changes in vehicle configuration, path, etc. to maintain a suitable and efficient operating position.

Figure 1:
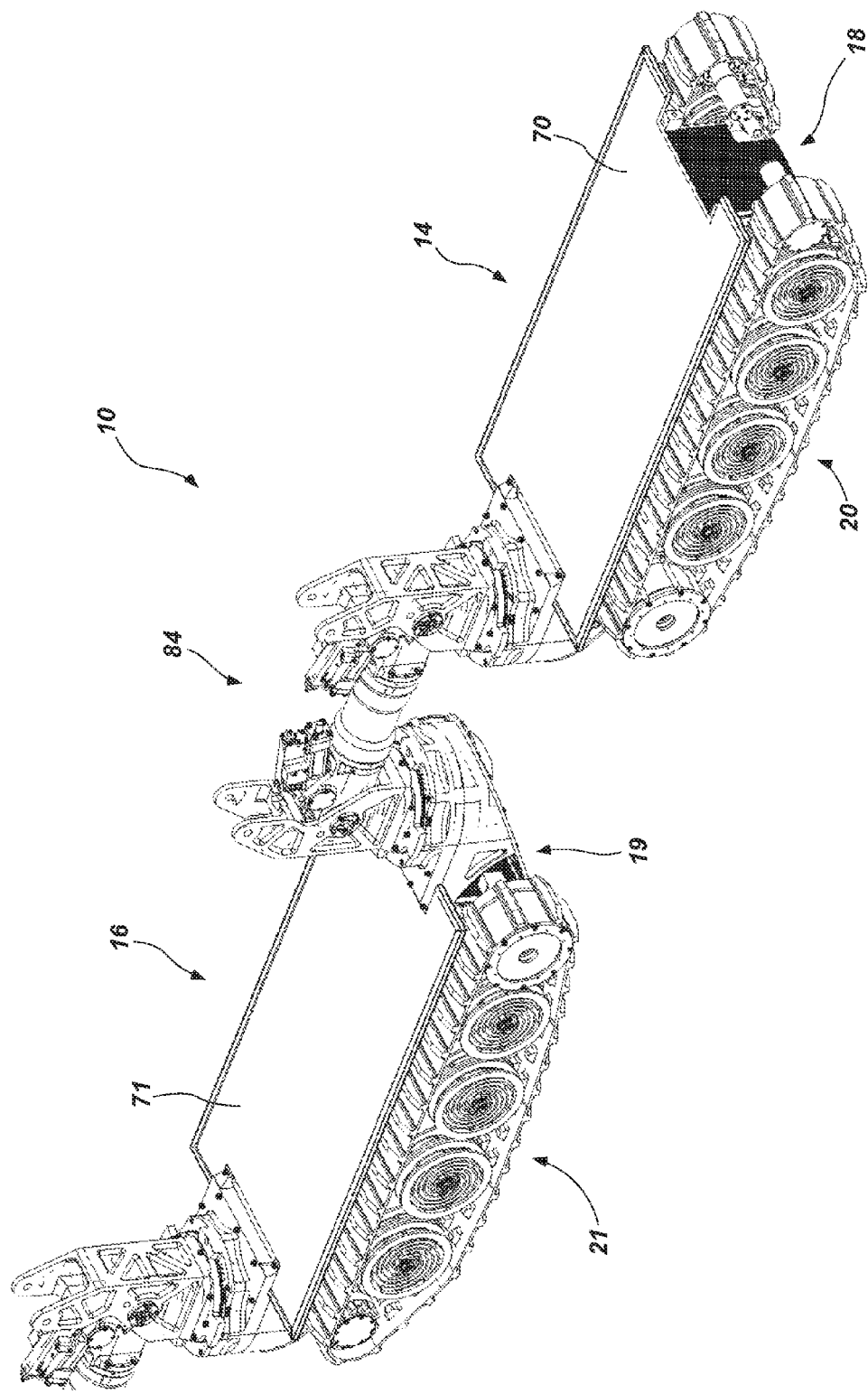
FIG. 1 illustrates a perspective view of a robotic mobile low-profile transport vehicle configured in accordance with one exemplary embodiment of the present invention, wherein two transport modules are illustrated as being coupled together in tandem.

With reference to FIG. 1, illustrated is a robotic mobile low-profile transport vehicle 10 (hereinafter "low-profile transport vehicle" or "vehicle") configured in accordance with one exemplary embodiment of the present invention. The low-profile transport vehicle 10 can comprise a first transport module 14 having a frame assembly 18 configured to support various components of the transport module 14, such as a mobility system 20, and a propulsion system (hidden from view) configured to provide powered locomotion to the first transport module 14 via the mobility system 20. A platform 70 can be supported about the frame assembly 18 and can be configured for supporting or carrying a load, such as a flat-bed configuration. The first transport module 14 is shown as being coupled in a tandem arrangement to a second transport module 16 by an articulating, multi-degree of freedom coupling assemblage 84. The second transport module 16 can also comprise a frame assembly 19 and a mobility system 21 to form at least a part of the exemplary low-profile transport vehicle 10, and a platform 71 can be supported about the frame assembly 19 for supporting or carrying a load. In one aspect, the second transport module 16 can be non-powered and can be towed or pushed by the first transport module 14. In another aspect, the second transport module 16 can be of a similar configuration and design as the first transport module 14 and can include a propulsion system, such that both the first and second transport modules can provide locomotive power to or within the low-profile transport vehicle 10.

In the embodiments discussed herein, the term low-profile is intended to describe a vehicle having individual transport modules with a small height to length ratio, which can result in a low normal center of mass (i.e., center of mass of an unloaded transport module or transport module with no extraneous load being carried except its own weight) in order to enhance operational stability of the vehicle, particularly when traversing uneven or irregular terrain, and particularly when carrying a load about its platform. While the individual transport modules may be designed with a low normal center of mass, this center of mass may be altered when a load is placed on the platform of a transport module, typically causing the center of mass to shift and to be located in a vertically elevated position, which can cause the loaded transport module to be less stable and more prone to tipping during operation than when unloaded. However, as will be discussed below, functionality within the low-profile transport vehicle can be provided to account for or accommodate such a shift in the center of mass to reestablish or regain stability of the vehicle (i.e., stabilize), when loaded, at least to some extent.

As will be shown below, a low-profile transport vehicle may comprise any number of transport modules, each being coupled to one or more adjacent transport modules with a multi-degree of freedom coupling assemblage. For example, a low-profile transport vehicle can include a third transport module joined to one of the first or second transport modules via a second multi-degree of freedom coupling assemblage. In another example, at least four transport modules can be joined together with various multi-degree of freedom coupling assemblages. In one aspect, discussed in more detail hereinafter, the transport modules can be removably coupleable to one another via an interconnect system operable with the coupling assemblage to selectively couple and decouple one transport module from another transport module, either manually or automatically. Thus, the transport modules can operate to decouple and operate in fully functional groups of transport modules (e.g., two or more), or as individual or single units depending upon their configuration. A control scheme can be operable to control operation of the robotic low-profile transport vehicle and can be switchable between, for example, a unitary mode and a division mode. In the unitary mode, the control scheme can facilitate coordinated control across transport modules and the coupling assemblage when coupled. In the division mode, the control scheme can facilitate independent operation of the transport modules when decoupled, whether in groups or as individual or single units.

In general, a transport module can include a frame assembly and a mobility system, to provide for or facilitate movement or mobility of the transport module about a ground or other surface. A mobility system can include a track, a wheel, an axle, suspension components, etc. that can be coupled to a frame assembly to provide for movement of the transport module. In one aspect, a transport module can include drive and other components as part of a propulsion system that is operable to power, or otherwise provide power, to the mobility system, and to provide for or facilitate powered locomotion of the transport module. When equipped with a propulsion system, the transport module may generally be referred to as a "propulsion module." A propulsion system can include a power plant/energy converter (e.g., internal combustion (IC) engine and generator, IC engine and transmission, a fuel cell, etc.), a track drive actuator, a drivetrain, an energy source, and/or an energy storage means, and any combination of these. As stated, a propulsion system can be operatively coupled with a mobility system to provide for powered propulsion of a transport or propulsion module. On the other hand, a transport module lacking propulsion system drive components can be referred to generally as a "non-powered module."

In one aspect, components of a propulsion system can be distributed across two or more transport modules. For example, a propulsion module can include a drive component, such as a drivetrain, that drives a track or wheel of the propulsion module. A non-powered module can carry or support other propulsion system components, such as a battery, an engine, an energy source, etc. Thus, the non-powered module can perform a supporting role for the propulsion module by housing or supporting one or more propulsion system components that can be utilized by the propulsion module. In a specific aspect, a non-powered module can support propulsion system components that are utilized by two or more propulsion modules. For example, a non-powered module can carry a fuel tank that is utilized by two engines, each of which is carried or utilized by a different propulsion module. Similarly, two or more propulsion modules can share propulsion system components. For example, an engine can be carried by a first propulsion module and power from the engine can be utilized by both the first propulsion module and a second propulsion module to drive the propulsion modules.

In still other exemplary embodiments, the low-profile transport vehicle 10 can be powered electrically, by an IC engine, or a hybrid combination of these. For example, a propulsion module can operate by deriving power from an IC engine driven generator (for extended range operation), or the propulsion module can derive its power from onboard batteries. In one aspect, power conversion and track actuation can be achieved using a hybrid electric vehicle architecture, wherein extended range of operation may be provided using an IC engine and hydrocarbon fuel as the energy converter and energy storage, which such operation may result in an increased acoustic signature, and wherein an intermittent short range of operation (e.g., 0-2 miles, depending upon the batteries) may be provided or achieved by driving the track(s) using electric motor(s) powered by batteries, which such operation may result in an acoustic signature that is significantly reduced over the extended range operation utilizing an IC engine. One example of a hybrid electric vehicle architecture comprises a parallel hybrid architecture, which includes a track drive transmission driven by an IC engine mechanically connected in parallel with an electric motor. In one operational scenario the electric motor may be used to supplement the IC engine power. In another operational scenario the electric motor may be used in greater capacity or alone for quiet operation. In still another operational scenario, the electric motor may serve as a generator to recharge the batteries. Another example of a hybrid electric vehicle architecture comprises a series hybrid architecture, which includes tracks actuated by electric motors with a transmission, and powered by batteries that are recharged by a generator driven by an IC engine.

The low-profile transport vehicle 10 can include a series of independent tracked or wheeled transport modules linked together by multi-DOF actuated coupling assemblages with high torque capability. In one aspect, transport modules can be used cooperatively to traverse complex terrain. For example, a control system, discussed further hereinafter, can operate to facilitate intra-module communication and coordination to provide an optimal configuration and operating mode of the transport modules and the coupling assemblage about a given terrain. In another aspect, a low-profile transport vehicle can be modular, scalable and/or reconfigurable to best satisfy objectives of specific missions or tasks (e.g., delivery of goods, transportation of injured people (e.g., hikers in rough terrain), combat, combat support, intelligence, surveillance, and/or reconnaissance, etc.). For example, a low-profile transport vehicle can dynamically modify its configuration and shape, which can enable the low-profile transport vehicle to maneuver over or around obstacles and to increase the stability of the vehicle. Additionally, individual transport modules can be added, subtracted, or replaced in a low-profile transport vehicle. This can allow the low-profile transport vehicle to be reconfigured with transport modules having a suitable combination of capabilities or attributes for a given mission or task. Furthermore, application of mission or task-specific packages can be mounted to a frame assembly of one or more transport modules in a low-profile transport vehicle in order to outfit the low-profile transport vehicle with a suitable combination of capabilities or attributes for that particular mission or task. In addition, a single low-profile transport vehicle can be separated or split into multiple low-profile transport vehicles.

Figure 2:
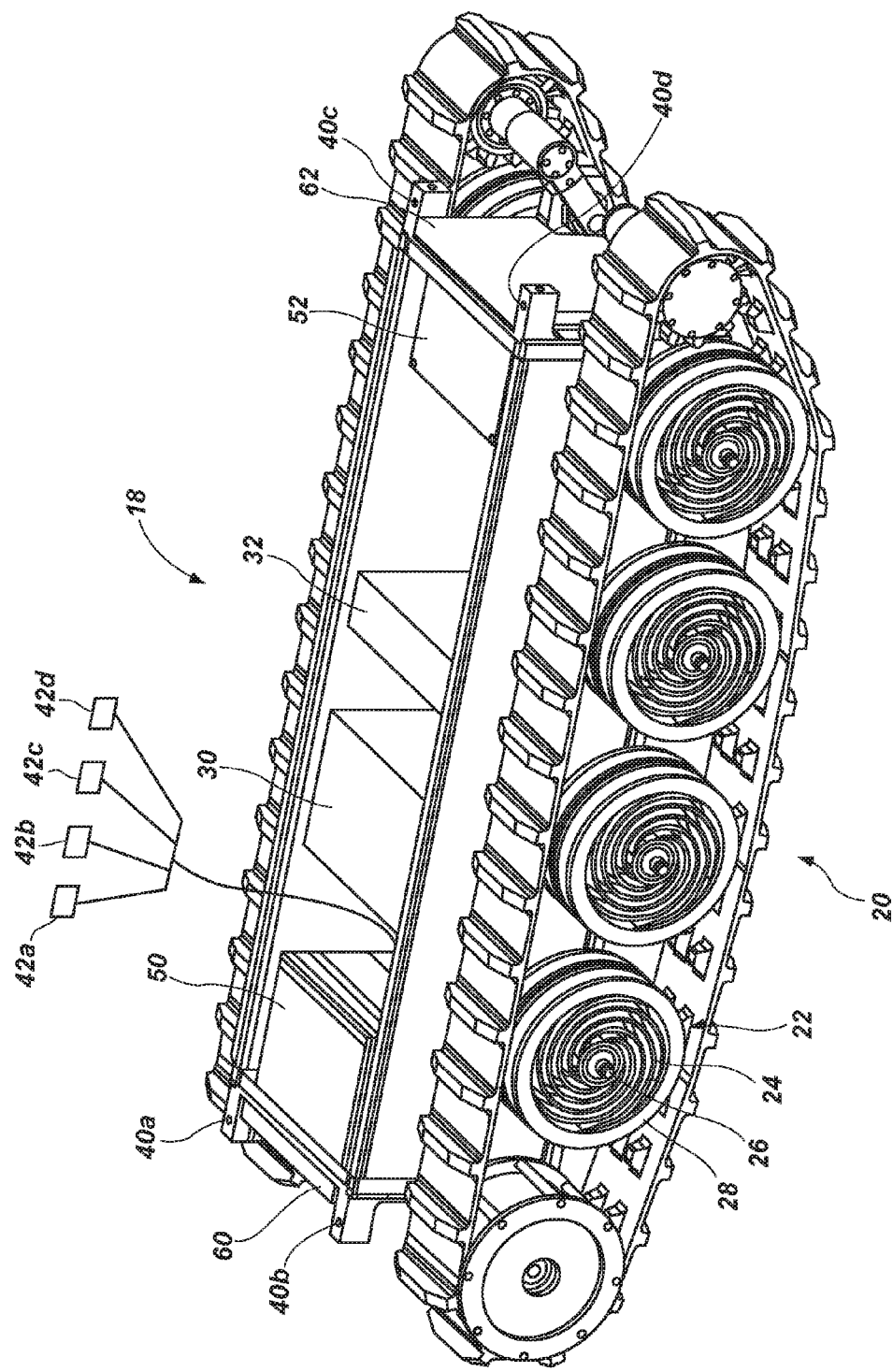
FIG. 2 illustrates a frame assembly and mobility system of the robotic mobile low-profile transport vehicle of FIG. 1.

With reference to FIG. 2, illustrated is the frame assembly 18 of the transport module 14 of FIG. 1. For clarity, the frame assembly 18 is shown isolated from select other components of the transport module 14. As mentioned above, the frame assembly 18 can be configured to support mobility system components 20 and propulsion system components, such as an engine 30 and a battery 32. Additionally, the frame assembly 18 can be configured to support electronic components 50, 52, such as those used for control, communication, etc., as well as a heat exchanger 60, 62 used to cool the electronic components 50, 52, respectively. The frame assembly 18 can be constructed of any suitable material, such as, but not limited to, a metal, polymer, composite, etc. In one embodiment, the frame assembly can be constructed of fiber reinforced molded thermoplastic shells that integrate interfaces for a heat exchanger, a coupling assemblage, and/or mobility components, such as drive train idlers and suspensions. In one aspect, the frame assembly can combine a light metal frame and stiff lightweight composite panels to form a light weight sealed structure. The frame assembly 18 can also include mechanical couplings 40a, 40b, 40c, 40d for structurally coupling a platform (e.g., a removable platform) to the frame assembly 18 of the transport module. Additionally, other couplings for a platform, such as a power coupling 42a, a hydraulic coupling 42b, a data coupling 42c, and/or a communications coupling 42d can be provided for coupling to mating couplings supported on the platform, thus providing facilitating the intended functionality of the platform and any components supported thereon.

A transport module may be equipped with various types of sensors that monitor its position, location, orientation, etc., the position, location, orientation, etc. of an adjacent transport module or other transport modules making up the vehicle, as well as the various conditions, objects, events, etc. about or within the operating environment. The low-profile transport vehicle is able to collect all of the information from these sensors and provide coordinated operation between the individual transport modules within the operating environment. The information collected can be used to achieve and maintain an optimal operating position for a given operating condition or environment.

Figure 3:
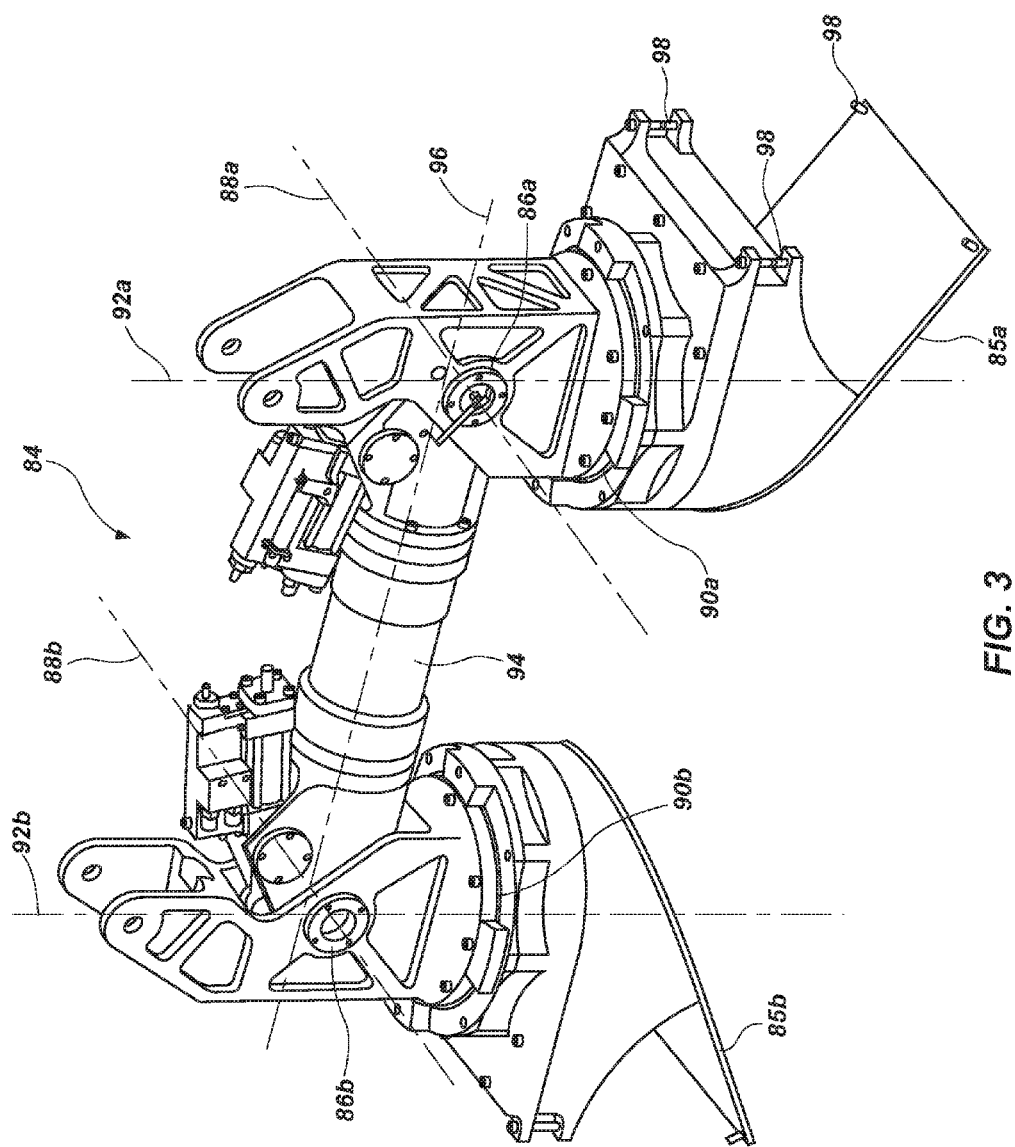
FIG. 3 illustrates a coupling assemblage of the robotic mobile low-profile transport vehicle of FIG. 1.

With reference to FIGS. 1 and 3, illustrated is the coupling assemblage 84 of the low-profile transport vehicle 10 shown in FIG. 1. For clarity, the coupling assemblage 84 is shown isolated from other components of the low-profile transport vehicle 10. The coupling assemblage 84 comprises a plurality of articulating joints that facilitate movement of the first transport module 14 relative to the adjacent second transport module 16 about several different axes. In the specific embodiment shown, the coupling assemblage 84 permits movement about five different axes and comprises five degrees of freedom. A first pitch joint 86a provides pitch rotation about a first pitch axis 88a ($1^{st}$ DOF). A first yaw joint 90a provides yaw or bending rotation about a yaw axis 92a ($2^{nd}$ DOF). A roll joint 94 provides roll rotation about a roll axis 96 ($3^{rd}$ DOF). A second yaw joint 90b provides yaw rotation or bending rotation about a yaw axis 92b ($4^{th}$ DOF). A second pitch joint 86b about the second transport module 16 provides pitch rotation about a second pitch axis 88b ($5^{th}$ DOF). The pitch and yaw axes provide different lateral axes. In the configuration illustrated in FIG. 3, the coupling assemblage components, such as joints, are elevated or extend above the elevation of the platforms, which can provide clearance for the coupling assemblage over rocks or other obstacles. In one aspect, the configuration of the joints, such as having vertical yaw axes to elevate pitch and roll axes, can be utilized to provide the elevation for clearance over obstacles. Of course, it is contemplated that the coupling assemblage may be configured differently to comprise more or less than five degrees of freedom. In one aspect, a linear degree of freedom can be provided, for example, parallel to one of the axes of the coupling assemblage 84.

The coupling assemblage 84 can also include skid plates 85a, 85b to protect at least a portion of the coupling assemblage 84 and/or portions of associated transport modules from damage due to obstacle. As shown, skid plates 85a and 85b are configured to extend from the coupling assemblage at least partially along the underside of the respective transport modules.

The multi-degree of freedom coupling assemblage 84 may further be configured to provide active, actuated movement about the various axes discussed above. For example, the first pitch joint 86a may comprise an actuator configured to provide active, actuated rotation about the first pitch axis 88a. The first yaw joint 90a may comprise an actuator configured to provide active, actuated rotation about the yaw axis 92a. The roll joint 94 may comprise an actuator configured to provide active, actuated rotation about the roll axis 96. The same may be true for any other joints within the coupling assemblage 84. It is also contemplated that movement in one or more degrees of freedom can be passive, or not actuated. Passive movement in a degree of freedom can be influenced, however, by a dampener, a spring, and/or a brake associated with the degree of freedom to aid or resist movement in the degree of freedom. A dampener can be configured with a fixed or adjustable dampening coefficient, to achieve a desired behavior of the coupling assemblage. For example, a variable dampener can be adjusted "on the fly" to provide relatively unhindered movement or to "lock up" an associated joint, such that no movement is possible about the joint. In one aspect, a solenoid can be used to control dampening characteristics. Likewise, preload on a spring can be altered to influence movement in a degree of freedom. Such control over the behavior of the joints can allow the low-profile transport vehicle to dynamically modify its configuration and shape, which can allow the vehicle to maneuver over or around obstacles, and can also increase the stability of the vehicle.

In one aspect, the coupling assemblage may comprise a high torque design capable of fixing one transport module in a position relative to an adjacent transport module for a given time. In some exemplary embodiments, the coupling assemblage may comprise a high torque design suitable to fix one transport module in a position relative to an adjacent transport module while carrying a load about the platforms of the transport modules. This capability may be advantageous in many operational situations, such as for steering the low-profile transport vehicle and when items are transported over uneven or complex terrain. By providing a high torque coupling assemblage, the orientation and positioning of the individual transport modules may be specifically controlled to enable the low-profile transport vehicle to achieve the most optimal operating configuration for travelling along a particular path.

For instance, upon encountering a bed of rocks or a ditch, or any other objects that might contribute to the undulating or uneven terrain to be traversed by the low-profile transport vehicle, rather than the individual transport modules conforming to an extent to the objects and the terrain, wherein the individual transport modules (or a group of transport modules) may be subject to tipping, sudden rises and falls, jarring, etc., the low-profile transport vehicle can be configured to be more rigid across any part of its length, allowing it to travel a more refined or graceful path that does not strictly conform to the undulating terrain. Indeed, any one transport module in a line of transport modules can steady, assist, or modify the behavior of an adjacent (e.g., leading or trailing or both) transport module as needed or desired. As shown and described herein, coordinated use of propulsion module tracks and a multi-DOF coupling assemblage can combine to produce multiple modes of locomotion. In some embodiments, it may be desirable to provide a high enough torque output to be able to manipulate adjacent transport modules and their associated loads in the manner described above, where the combined weight of the transport module and its associated load is several times the weight of an individual, unloaded transport module. In one aspect, a coupling assemblage can be configured to provide a torque capacity capable of lifting at least an adjacent transport module and, more particularly, an adjacent transport module and its payload. To achieve this, the coupling assemblage may be sized and configured as appropriate.

Different types of actuators are available that can impart a high torque output to the various joints of the coupling assemblage 84. For example, depending upon the particular design of the coupling assemblage and the intended application, actuator types may comprise linear actuators, rotary actuators, high-torque servo motors, hydraulic actuators, electric actuators, pneumatic actuators, moving coil actuators, and any combination of these.

The transport modules and coupling assemblage can operate cooperatively to achieve high levels of mobility in complex terrain, while maintaining a narrow footprint. In the event that the low-profile transport vehicle tips or rolls over, the transport modules and coupling assemblage can operate cooperatively to self-right the vehicle. The coupling assemblage can therefore allow coupled propulsion modules to carry out dynamic maneuvers, such as controlled roll or roll-over recovery, overcome tall obstacles, and climb very steep hills (using push-pull track action between adjacent propulsion modules without buckling of the coupling assemblage). The coupling assemblage can include force-moment sensors that provide quantitative data on the interaction forces between coupled transport modules, and which can be used by control algorithms to produce desired behaviors by the low-profile transport vehicle.

In one aspect, the transport modules and coupling assemblage can be configured to be water resistant and/or waterproof to withstand rain exposure and submersion. This can involve seals or other water proofing measures employed about the coupling assemblage joints to protect the actuators or bearings from water contamination or damage. Similar measures can be taken for sealing the various components of the individual transport modules.

As mentioned above, transport modules can be removably coupleable to one another via an interconnect system operable with the coupling assemblage to selectively couple and decouple one transport module from another transport module. Thus, in one aspect, the multi-degree of freedom coupling assemblage can comprise or otherwise be associated and operable with an interconnect system having joints that are removably coupled to one another, such that any individual transport module may be independently operated, or coupled to an adjacent transport module to form a multi-module low-profile transport vehicle. In some embodiments it may be advantageous to decouple the transport modules from one another, and to operate these independently, or in smaller groups. In this case, two or more (or even each) transport modules may be configured to comprise all of the power, sensing and control systems that may be found or spread across a plurality of transport modules joined together in a multi-module low-profile transport vehicle. A control scheme can control operation of the robotic low-profile transport vehicle, and can be switchable between a unitary mode and a division mode. In the unitary mode, the control scheme can facilitate coordinated control across coupled transport modules and the coupling assemblage. In the division mode, the control scheme can facilitate independent operation of individual and/or groups of decoupled transport modules. In one aspect, switching between the unitary mode and the division mode can be automatic upon the decoupling event. In another aspect, the switching can be done selectively and/or manually.

Coupling and decoupling of the various joints in the coupling assemblage with the interconnect system may be accomplished in a variety of ways. In one aspect, the coupling assemblage can remain intact, but one end can be decoupled from a transport module. Different types of coupling methods that may be used to join various segments of the coupling assemblage together or to decouple the coupling assemblage from a transport module may comprise pin connections, torque couplings, and others known in the art. In one aspect, the coupling assemblage 84 can be decoupled from a transport module by removing pins or fasteners 98, for example. In another aspect, the coupling assemblage can be rapidly decoupled from a transport module, without tools, via an interconnect system equipped with a quick connect/disconnect mechanism or system. Similarly, electrical wires carrying power and communication signals, hydraulic hoses, fuel lines, etc. (not shown) going from one transport module to another transport module can also be connected and disconnected using known quick connect/disconnect mechanisms or systems.

The transport modules of the low-profile transport vehicle may be configured in a number of different ways. FIGS. 4A and 4B illustrate a transport module in accordance with another exemplary embodiment. As shown, the transport module 114 comprises a frame assembly 118 having a lateral frame component 122 and an outer frame component 126 that extends outward and downward from the lateral frame component 122 to define two track channels (for example, see track channel 130), and an upper surface 134. The frame assembly 118 is configured to support the mobility and propulsion system 140 that facilitates powered locomotion of the transport module 114. The frame assembly may be configured to provide a desired ground clearance and an overall height. In the embodiment shown, the lowermost surface of the lateral frame component 122 is located a distance $h_1$ off of the ground, with the overall height being $h_2$, as measured from the ground to the upper surface 134.

The combination mobility and propulsion system 140 comprises a two-track design, wherein the propulsion system 140 comprises a first endless or continuous track 142 and a second endless or continuous track 144, these being positioned within the respective track channels defined by the frame assembly 118. A track can be configured to be fouling resistant, energy efficient, and having a tread configured for negotiating rough terrain. One benefit of two-track transport modules with independently actuated tracks, for example, is that each transport module can be operated independently and skid steered.

The first endless track 142 is supported about track wheels, such as drive wheels 146 and 148 (or alternatively a drive wheel 146 and an idler wheel 148) and ground wheels 150, 152 and 154 to place the endless track 142 in the configuration shown. The drive wheels 146 and 148 are supported about the lateral frame component 122 via axles (see axle 156 supporting drive wheel 148). The ground wheels are supported about the outer frame component 126 via axles (see axle 158 supporting ground wheel 154). In one aspect, referring back to FIG. 2, the track wheels can combine the function of idler and suspension for reduced weight. For example, a track wheel 22 can include one or more spokes 24 spiraling from a center hub 26 to an outer rim 28 of the wheel 22. The spiraling spokes 24 can be configured to provide compliance between the hub 26 and rim 28 that can serve as a suspension for the frame assembly 18.

The configuration and operation of the track-type propulsion systems of some embodiments may be accomplished in a variety of ways as will be apparent to those skilled in the art of tracked vehicles. For example, the endless track may comprise a series of lugs that protrude upward from an inner surface of the track that engage or otherwise interface with the drive and other wheels to provide positive or powered propulsion or locomotion. In another example, the track may comprise a friction-type interface with the drive wheels, wherein the endless tracks are held in place and in tension by a friction fit. The various drive, idler and ground wheels may also be configured in a variety of ways to provide different track profiles. For example, the drive and ground wheels may all be situated in a common plane. In another example, the drive and ground wheels may be situated about different axes or in different elevations, to provide the track with an inclined end or ends, such as the configuration shown in FIGS. 1 and 4B. Still further, the mobility system can comprise single or multiple track designs as shown in the drawings and discussed herein.

With further reference to FIGS. 4A and 4B, the combination mobility and propulsion system 140 can further comprise a motor (not shown, but see motor in FIG. 2) supported on the transport module 114 to provide power to the drive wheel(s). Although not shown, the second endless track 144 is similarly supported using drive and ground wheels as supported about the frame assembly 118. Steering of the transport module may be accomplished by rotating the two tracks in different directions or at different speeds. Alternatively, and in some exemplary embodiments in which the coupling assemblage is actuatable, or at least comprises one or more actuatable joints, steering may be accomplished by actuating all or part of the multi-degree of freedom coupling assemblage 184.

The transport module 114 further comprises a platform 170 supported about the frame assembly 118, configured to receive and carry a load 4 as placed thereon. In this embodiment, the platform 170 comprises the upper surface 134 of the frame assembly 118, but this is not intended to be limiting in any way. As shown in the drawings and as described in detail below, the platform 170 may comprise a separate, independent structural component that operatively couples to the frame assembly 118. The platform 170 may further comprise a perimeter or other rail 136 to assist in the containment or securing of the load about the platform 170. The platform 170 is shown as spanning the width of the transport module 114. Other designs are contemplated herein, such as a platform that extends beyond the sides or ends of the frame assembly 118, or that terminates a distance from the sides or ends of the frame assembly 118.

Further illustrated is a multi-degree of freedom coupling assemblage 184 used to join the transport module 114 to an adjacent transport module, and to provide or facilitate coordinated, articulated movement between the two transport modules about multiple degrees of freedom.

Figure 5:
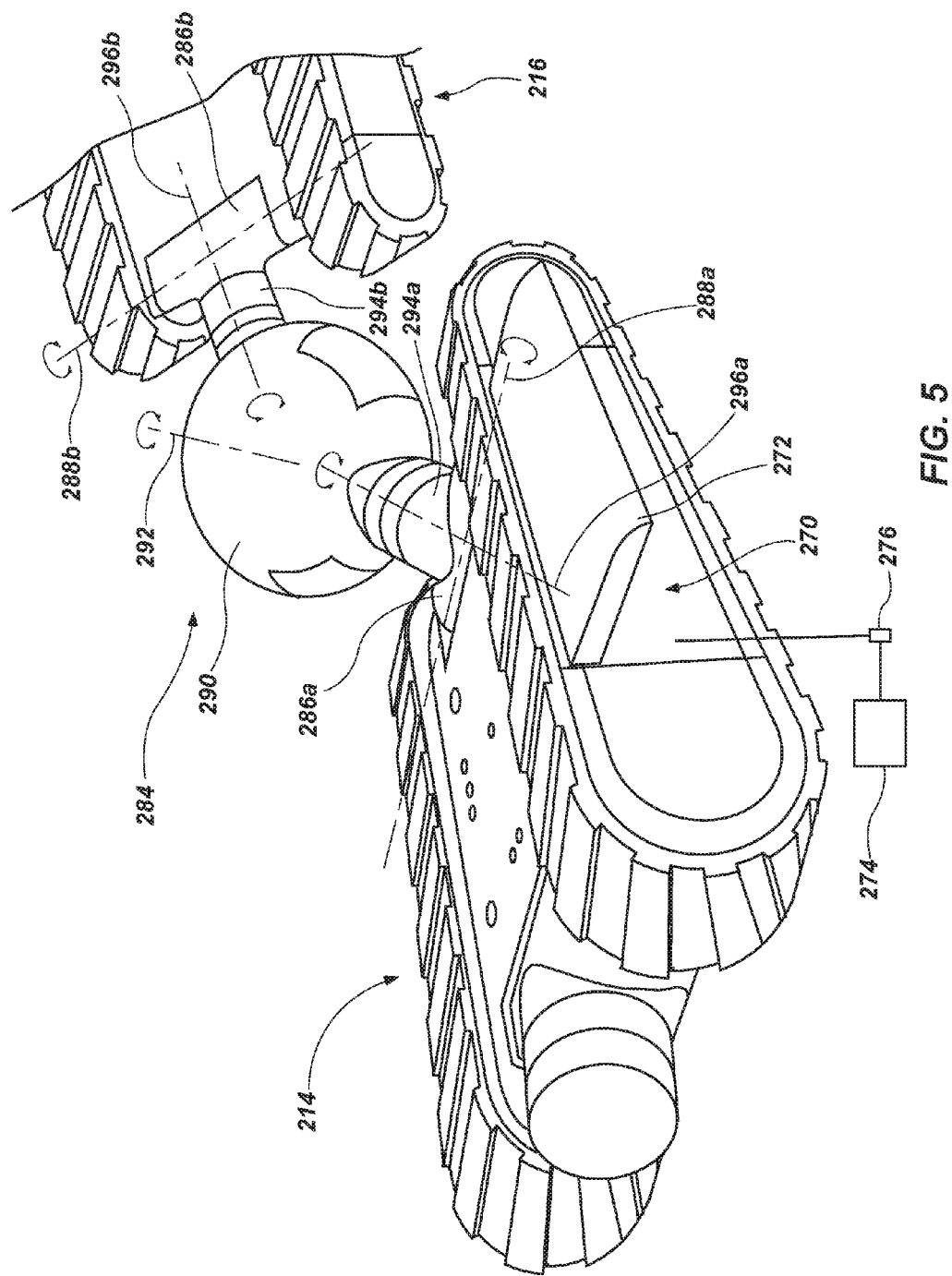
FIG. 5 illustrates a partial perspective view of a robotic mobile low-profile transport vehicle configured in accordance with another exemplary embodiment of the present invention, wherein two transport modules are joined together by a coupling assemblage having five degrees of freedom.

FIG. 5 illustrates a multi-degree of freedom coupling assemblage formed in accordance with another exemplary embodiment of the present invention. The exemplary coupling assemblage is sometimes referred to as a low-profile coupling assemblage. Advantageously, this low-profile coupling assemblage is designed so that all or most of its operational configurations keep it positioned below the platform height so that loads can be lay across two transport modules without interference from the low-profile coupling assemblage (e.g., see FIG. 12). The coupling assemblage 284 comprises a plurality of articulating joints that facilitate movement of a first transport module 214 relative to an adjacent second transport module 216 about several different axes. In the specific embodiment shown, the coupling assemblage 284 permits movement about five different axes and comprises five degrees of freedom. A first pitch joint 286a about the first transport module 214 provides pitch rotation about a first pitch axis 288a ($1^{st}$ DOF). A yaw joint 290 provides yaw or bending rotation about a yaw axis 292 ($2^{nd}$ DOF). A first roll joint 294a about the first transport module 214 provides roll rotation about a roll axis 296a ($3^{rd}$ DOF). A second pitch joint 286b about the second transport module 216 provides pitch rotation about a second pitch axis 288b ($4^{th}$ DOF). A second roll joint 294b provides roll rotation about a second roll axis 296b ($5^{th}$ DOF). The first and second roll axes provide two different longitudinal axes. The pitch and yaw axes provide different lateral axes. Of course, it is contemplated that the coupling assemblage may be configured differently to comprise more or less than five degrees of freedom.

The multi-degree of freedom coupling assemblage 284 may further be configured to provide active, actuated movement about the various axes discussed above. For example, the first pitch joint 286a may comprise an actuator configured to provide active, actuated rotation about the first pitch axis 288a. The yaw joint 290 may comprise an actuator configured to provide active, actuated rotation about the yaw axis 292. The first roll joint 294a may comprise an actuator configured to provide active, actuated rotation about the roll axis 296a. The same may be true for any other joints within the coupling assemblage 284.

In one example, transport module 214 can include a bay 270 that can be used for storage and/or to house and support various electrical, data, and/or communication system components that may be used by the transport module 214 and/or by a low-profile transport vehicle, such as data communication system 274, which can be connected to a control system by a power, data, and/or control connection 276. A door 272 can be incorporated to provide a cover or enclosure for the bay 270.

Figure 6:
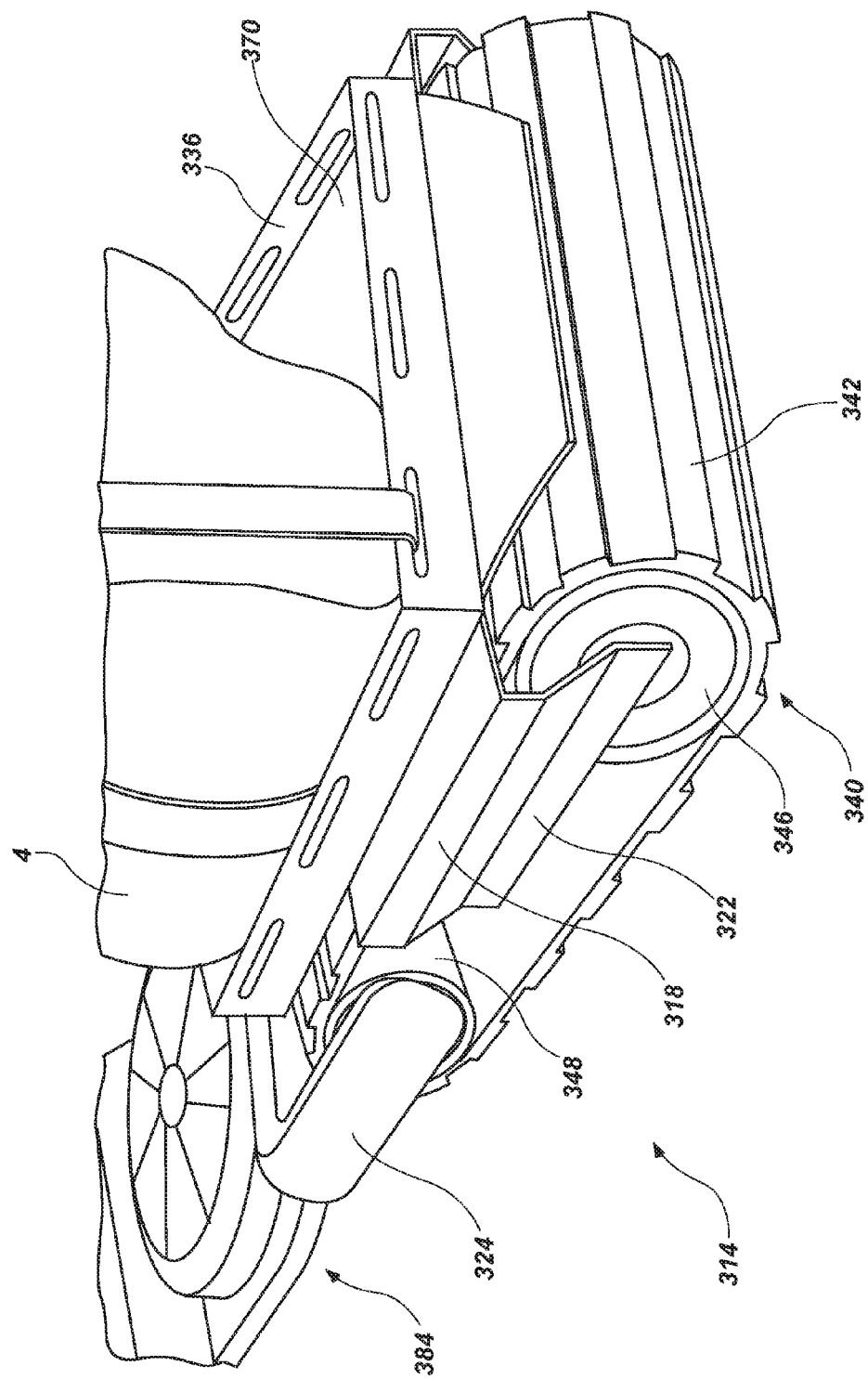
FIG. 6 illustrates a partial perspective view of a transport module formed in accordance with another exemplary embodiment of the present invention, wherein the transport module comprises a single track design.

Referring now to FIG. 6, illustrated is a transport module formed in accordance with another exemplary embodiment of the present invention. In this embodiment, the transport module 314 comprises a frame assembly 318 having a first lateral frame component 322 and a second lateral frame component 324. The first lateral frame component 322 further comprises an upper surface 334 that forms or provides a platform 370 having a perimeter rail 336 for receiving and carrying a load 4.

The transport module 314 further comprises a mobility and propulsion system 340 having a front drive wheel 346 supported by the first lateral frame component 322, and a rear drive wheel 348 supported by the second lateral frame component 324. The drive wheels 346 and 348 function together to support and drive a single endless or continuous track 342 that extends between the edges of the first lateral frame component 322, and that contacts the ground for propulsion. The endless track 342 may be supported and driven by the drive wheels 346 and 348 in any manner as described herein, or as would be apparent to those skilled in the art of tracked vehicles. In this embodiment, to steer the transport module 314, the multi-degree of freedom coupling appendage 384 may be actuated along a vertical axis to provide yaw rotation of the transport module 314 relative to an adjacent transport module.

A single endless track per transport module configuration can enable a low track contact pressure (<0.5 psi), which can be useful on soft surfaces, such as soft sand or snow covered terrain. Additionally, a single endless track per transport module configuration can reduce a chance of hang-up while operating in very rough terrain, especially when combined with the articulated coupling assemblage and a relatively smooth surface. With a single endless track per transport module, steering can be accomplished via the coupling assemblage and, as a result, such a low-profile transport vehicle would likely comprise at least one pair of transport modules connected by the coupling assemblage. A single track (or single actuated track) transport module may prove advantageous by integrating the primary power source in one transport module and distributing electrical power to other transport modules.

Figure 7:
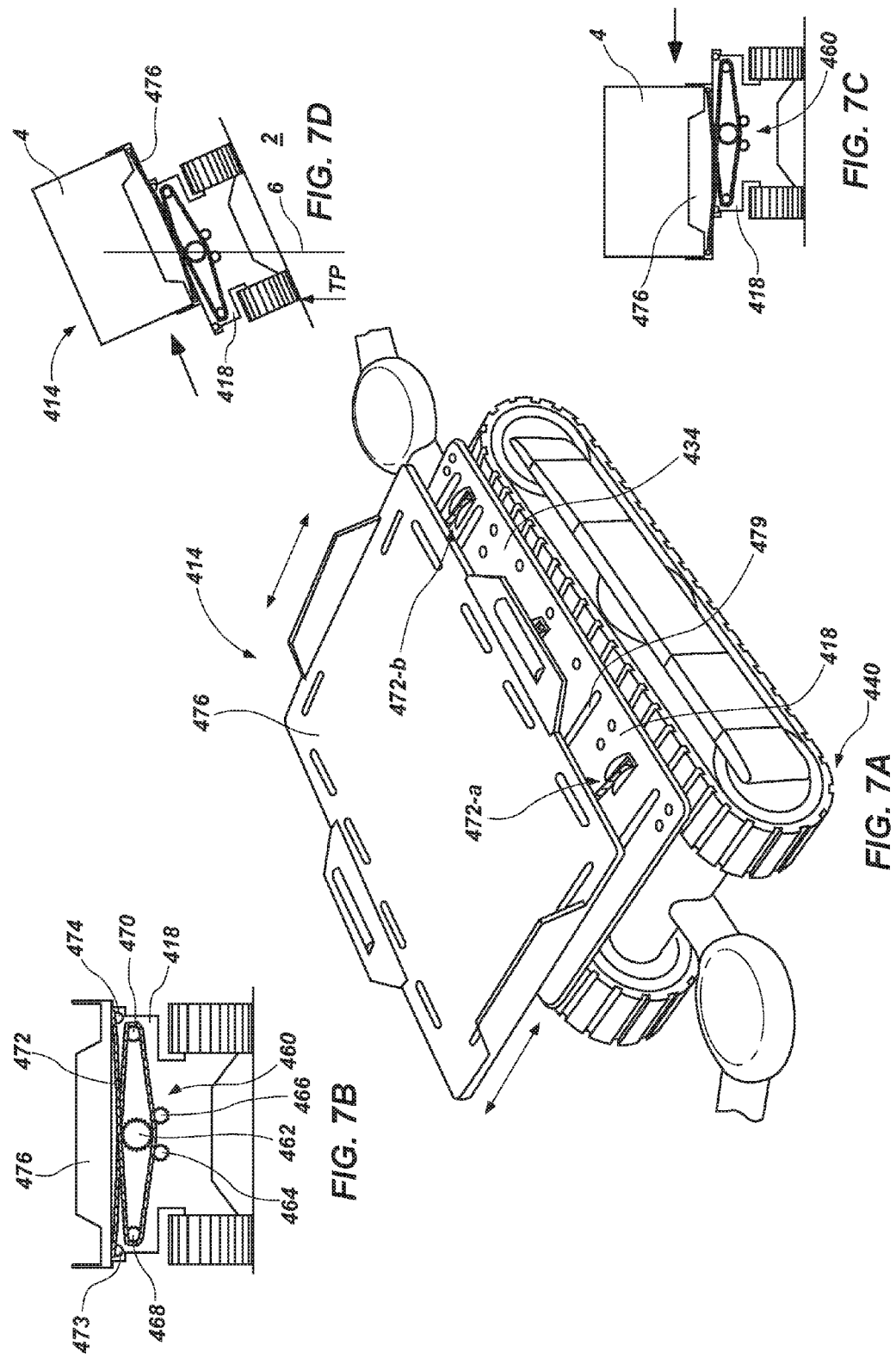
FIG. 7A illustrates a perspective view of a transport module configured in accordance with another exemplary embodiment of the present invention, wherein the transport module comprises one exemplary translation system for translating the platform in a lateral direction.
FIG. 7B illustrates a cross-sectional view of the transport module of FIG. 7A.
FIG. 7C illustrates a cross-sectional view of the low transport module of FIG. 7A, with a load disposed about the platform.
FIG. 7D illustrates an end view of the transport module of FIG. 7A in an operational mode, wherein the platform, carrying the load, has been shifted laterally to the right to stabilize the transport module as it traverses over an inclined ground surface.

FIGS. 7A and 7B illustrate a transport module formed in accordance with another exemplary embodiment of the present invention. The transport module 414 comprises a frame assembly 418, a mobility and propulsion system 440 and a platform 476 somewhat similar to the other transport modules discussed herein in that it can receive and carry a load. However, in this embodiment, and unlike the embodiments discussed above, the transport module 414 further comprises a moveable platform 476 and a translation system configured to facilitate translation or shifting or moving of the platform 476 in at least one degree of freedom, such as a lateral direction (direction orthogonal to the longitudinal axis of the transport module), in opposing directions about the frame assembly 418. The movable platform can be actively translated to increase stability on narrow, undulating inclined paths. As discussed above, the transport modules of the present invention may be designed with a low center of mass so as to provide enhanced stability to an overall robotic mobile low-profile transport vehicle that includes the multiple transport modules. However, the center of mass of the transport module can be altered, modified or shifted by disposing a load about the platform 476, by translating or moving the platform 476 relative to the frame assembly 418, and/or by operating the transport module on different or uneven terrain. To maintain stability to the extent possible (maintain the transport module in an upright position, for example, to prevent tipping), it is desirable to locate and keep the center of mass in a position as close to a vertical centerline as possible.

Although the movable platform 476 is illustrated as having movement in a lateral degree of freedom, it should be recognized that a movable platform can have movement in any degree of freedom. For example, a moveable platform can have movement in six degrees of freedom, three translational degrees of freedom (i.e., two in a lateral direction, one in a vertical direction), and three rotational degrees of freedom (i.e., rotation about three axes). In one aspect, a movable platform can include a track to guide movement of the platform. Such a track can define any path for the movable platform, such as an arc.

In this embodiment, the translation system 460 is shown as comprising a plurality of chain drive systems, wherein a first chain drive system 472a is located about a rear section of the transport module 414, a second chain drive system 472b is located centrally about the transport module, and a third chain drive system 472c is located about a front section of the transport module 414. Of course, the number and location of chain drive systems shown is not meant to be limiting in any way. By actuating the chain drive systems 472 a-c, the platform 476 may be caused to displace in a lateral direction relative to the frame assembly 418 and the upper surface 434 of the frame assembly 418, thereby altering the center of mass of the transport module 414. To reduce friction, as well as to help guide the platform 476 properly about the frame assembly 418 during translation of the platform 476, a plurality of rails 479 may be provided as shown. Of course, other types of friction reducing surfaces or elements and guides may be provided (e.g., rollers, as discussed below), these being contemplated herein.

FIGS. 7B and 7C illustrate a cross-sectional end view of the transport module 414 to provide a detailed view of the chain drive system 472a. The translation system 460 comprises a motorized drive sprocket 462, and a plurality of idler gears or sprockets 464, 466, 468 and 470 supported strategically by the frame assembly 418. A chain 472 is disposed about or wrapped around the drive sprocket 462 and the several idler gears, such that operation or actuation of the drive sprocket to cause it to rotate will subsequently cause the idler gears to rotate and the chain 472 to be displaced. Using any one of known fasteners, a first end of the chain 472 is securely fastened to one side of the platform 476 at a mount location 473, with the second end of the chain 472 being securely fastened to the other side of the platform 476 at a mount location 474. With the chain 472 wrapped around the sprocket and idler gears, and secured to the platform 476 as shown, the drive sprocket 462 may be rotated to displace the chain 472, which translates or displaces the platform 476. Rotating the drive sprocket 462 in a clockwise manner will cause the platform 476 to shift to the right. Likewise, rotating the drive sprocket 462 in a counter clockwise direction will cause the platform 476 to shift to the left. The amount of rotation imparted to the drive sprocket 462 by the motor (not shown) will determine the displacement distance of the platform 476 about the frame assembly 418.

FIG. 7D illustrates the transport module 414 in an operational environment, and particularly as traversing a ground surface 2 having an incline. As the transport module 414 is traversing the ground surface 2 in a direction across the incline (rather than in a direction with the incline (i.e., up or down)), there is a tendency for the transport module to become more unsteady than if traversing a flat ground surface. This is because the center of mass of the transport module 414 is caused to be moved to the left of the vertical centerline 6 in a direction downhill from the centerline 6, thus making the transport module 414 more prone to tipping. The transport module 414 may be even more prone to tipping in the event a load 4 is disposed about the platform 476 as the load 4 will likely place the center of mass of the transport module and load combination in a more elevated position about a vertical axis compared to where it was without the load. Causing the platform 476 (and any load thereon) to translate laterally to the right, as shown in FIG. 7D, will shift or alter the center of mass so that it is positioned closer to the centerline (or possibly to the right of the centerline in an uphill position), and at least to the right of an axis extending through the tipping point TP of the transport module 414. The translation system can be actuated in a variety of ways. In one exemplary embodiment, the translation system can be actuated by an operator as needed or desired. In another exemplary embodiment, the translation system can be actuated automatically in response to a particular vehicle condition or configuration (e.g., the associated transport module beginning to tip, etc.). In this embodiment, the transport module(s) can be equipped with one or more sensors to detect the center of mass or other vehicle condition, wherein the translation system can be automatically actuated in response to information obtained by the sensors, such as information indicating the shifting of the center of mass outside a given or pre-determined range of acceptable values. Actuation of the translation system could at least partially compensate for the sensed instability of the transport module by shifting the platform and adjusting the center of mass to again stabilize the vehicle.

By manipulating and selectively shifting the platform 476, and any load thereon, the stability of the transport module 414 can be increased about the same ground surface condition. The translation system can therefore operate to dynamically alter the center of mass of a transport module in order to actively enhance stability of the transport module during operation. The translation system and the ability of the low-profile transport vehicle to dynamically adjust and change configuration can allow the vehicle to operate in rough terrain and over narrow paths that are traditionally reserved for human legged locomotion.

In one aspect, the movable platform can incorporate gravity compensation.

Figure 8:
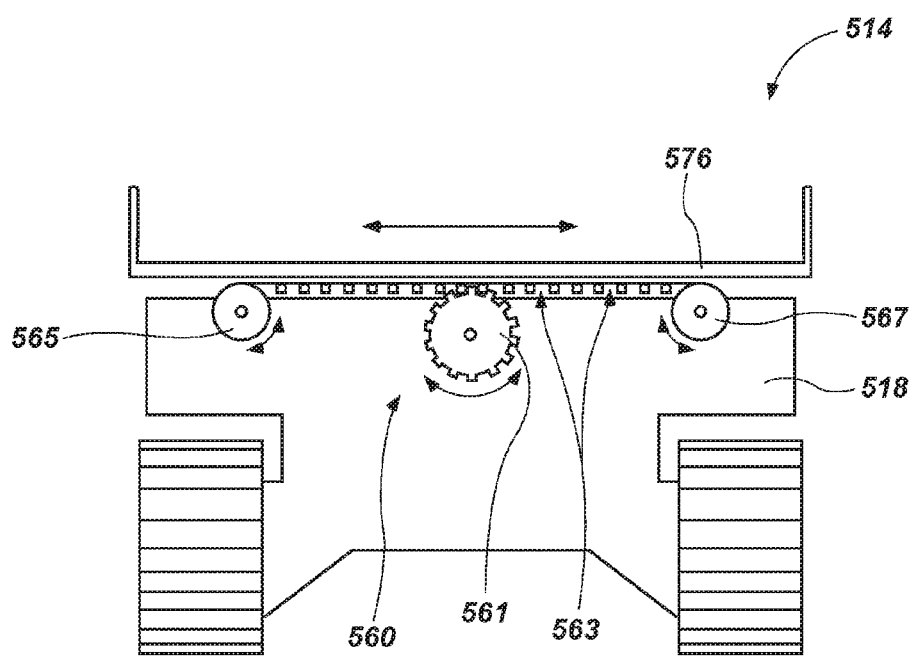
FIG. 8 illustrates an end view of a transport module configured in accordance with another exemplary embodiment of the present invention, wherein the transport module comprises another exemplary translation system for translating the platform in a lateral direction.

FIG. 8 illustrates a cross-sectional view of an exemplary transport module comprising a translation system configured to facilitate translation or shifting of a moveable platform in a lateral direction, wherein the translation system is configured in accordance with another exemplary embodiment. In this particular embodiment, the translation system 560 functions similar to the translation system 460 discussed above with reference to FIGS. 7A-7D. However, the translation system 560 comprises a rack and pinion gearing system (or several of these) supported about the frame assembly 518 of the transport module 514 to impart lateral movement to the platform 576 for the purposes discussed above. Specifically, the translation system 560 comprises a drive pinion gear 563 supported about the frame assembly 518, and having a plurality of teeth or lugs that mesh with a plurality of teeth or lugs formed on a rack 563 supported about the moveable platform 576. Rotating the drive pinion gear 561 clockwise will cause the platform 576 to displace to the right. Likewise, rotating the drive pinion gear 561 counterclockwise will cause the platform 576 to displace to the left. Also shown are rollers 565 and 567 supported about the frame assembly 518, which extend above the upper surface 534 of the frame assembly 518 to contact an underside or lower surface of the platform 576. The rollers 565 and 567 may be configured to support and guide the platform 576 as it translates relative to the frame assembly 518. The rollers 565 and 567 further function to reduce the friction acting on the platform 576 as it is displaced.

Although not specifically described herein, other translation systems configured for translating a moveable platform situated about a transport module in a lateral direction are contemplated herein. As such, those discussed above and shown in the drawings are not intended to be limiting in any way.

In some embodiments, the low-profile transport vehicle can include transport modules that are specific payload modules. These modules are designed to support a specific task or mission. In some embodiments, a transport module is permanently enhanced to be one or more specific payload modules. In other embodiments, the transport module includes one or more interchangeable payload modules that removably couple to, and that are supported by, one or more transport modules within the low-profile transport vehicle. Referring again to FIG. 2, the frame assembly 18 of a transport module can include an interchange interface that operates to facilitate removable coupling of a platform or payload module, discussed further hereinafter, with a transport module. For example, the interchange interface can include mechanical couplings 40a, 40b, 40c, 40d for structurally coupling a platform or payload module to the frame assembly 18 of a transport module. Additionally, the interchange interface can include any other type of coupling to bring online or otherwise render operable a platform or payload module, such as power couplings 42a, hydraulic couplings 42b, data couplings 42c, communications couplings 42d, or a combination of these that may be coupled to mating couplings on a platform or payload module. In one aspect, the various couplings can be made available on a platform or payload module, such as the stationary platform 70 in FIG. 1 or the movable platform 476 in FIG. 7A. In other words, a payload module can couple directly to a frame assembly or to a platform that is coupled to a frame assembly. Such couplings can enable the coupling of interchangeable applications or mission-specific packages or payload systems to individual transport modules, which can allow a low-profile transport vehicle to be reconfigurable and modifiable to meet the demands of a given mission, task or objective.

In general, an interchangeable payload system can include a payload module and an interchange interface operable to removably couple the payload module to the transport vehicle. The interchange interface, as mentioned above, can include various couplings for removably coupling the payload module to a transport module.

The payload module can include any feature that may be needed for a given mission or task. For example, a payload module can include mission or task-specific items or features such as munitions, explosives, supplies (food, water, fuel, batteries, medical supplies, etc.), medical equipment, additional power systems for extended ranges of operation, weapons, sensors (camera, audio, seismic, CRBNE sensors), a robotic arm or hand (manipulator), machine tools (e.g., for breaching), communication relays, a geo-location package, designators, personnel transport systems, etc. Additionally, a payload module can be configured as a firearm support payload module and can be outfitted to transport or equip heavy weapons, such as a .50 caliber machine gun, an 81 mm mortar, and/or an antitank missile system to increase fire power and lethality of soldiers. In one aspect, a payload module can be configured as a storage payload module, wherein certain mission or task-specific items can be stored or located in a frame assembly, on a platform, or in a storage compartment of a payload module. In another aspect, a payload module can be configured with mission or task-specific features, systems, equipment, tools, etc. Generally speaking, a payload module can be of any type. Examples of payload module types include, but are not limited to, a lift payload module, an armored payload module, a platform payload module, a missile launch payload module, a missile launch support module, a medical evacuation payload module, a medical support payload module, a robotic arm payload module, a power payload module, a battery recharge payload module, a stabilizing payload module, an operator payload module, a communications payload module, a firearm support payload module, a camera payload module, a sensor payload module, a storage payload module, and combinations thereof.

Figure 9:
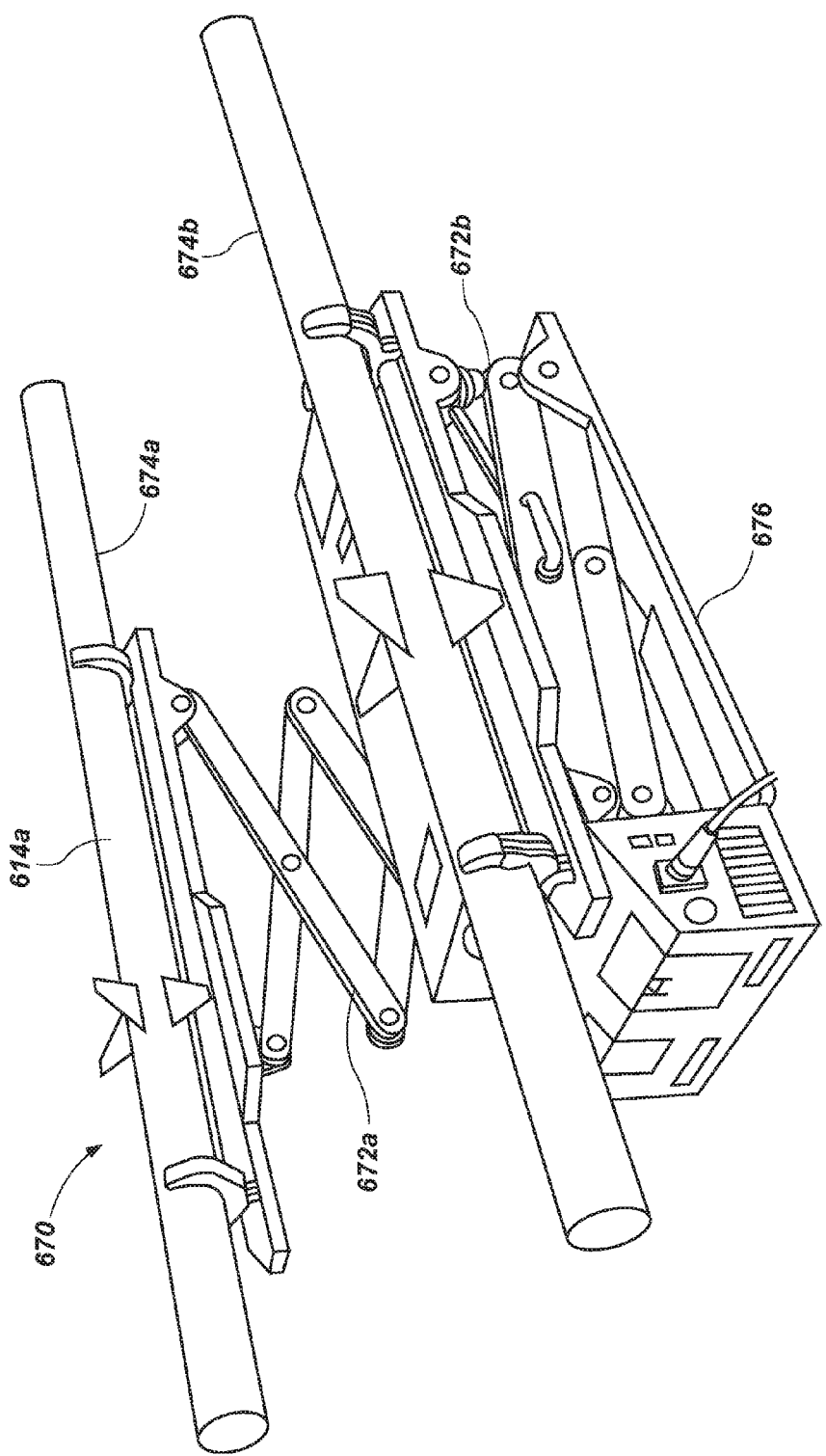
FIG. 9 illustrates a scissor lift payload module in accordance with an exemplary embodiment of the present invention.

In one exemplary embodiment of a payload module, FIG. 9 illustrates a payload module 670 in the form of a lift payload module having a lift system. The lift system as part of the payload module 670 can be configured to provide a translational degree of freedom in a generally vertical direction away from a transport module. The lift system of the payload module 670 can include a scissor-type lift system comprising scissor jack 672a that can be configured to lift and/or position an object 674a. In one aspect, a second scissor jack 672b can be included that can be configured to lift and/or position a second object 674b. In another aspect, control of the lift system can incorporate gravity compensation. The scissor jack 672a-b can be supported by a base 676, which can include interchange interface features to facilitate removable coupling of the lift system payload module 670 with a transport module. Of course, those skilled in the art will recognize that other types of lift systems may be employed within an interchangeable and removable payload module. As such, the scissor-type lift system discussed herein is not meant to be limiting in any way.

In one aspect, a payload module can be configured to provide movement in one or more degrees of freedom, similar to a movable platform, as discussed above. Thus, a payload module can be configured as a platform payload module and/or a stabilizing payload module and can comprise a built-in translating system to facilitate movement of the payload module in one or more degrees of freedom relative to a frame assembly to which the payload module can be attached. For example, the combination of the chain drive translating system with the scissor lift system could provide a platform that was movable along the x, y, and z axes.

Figure 10:
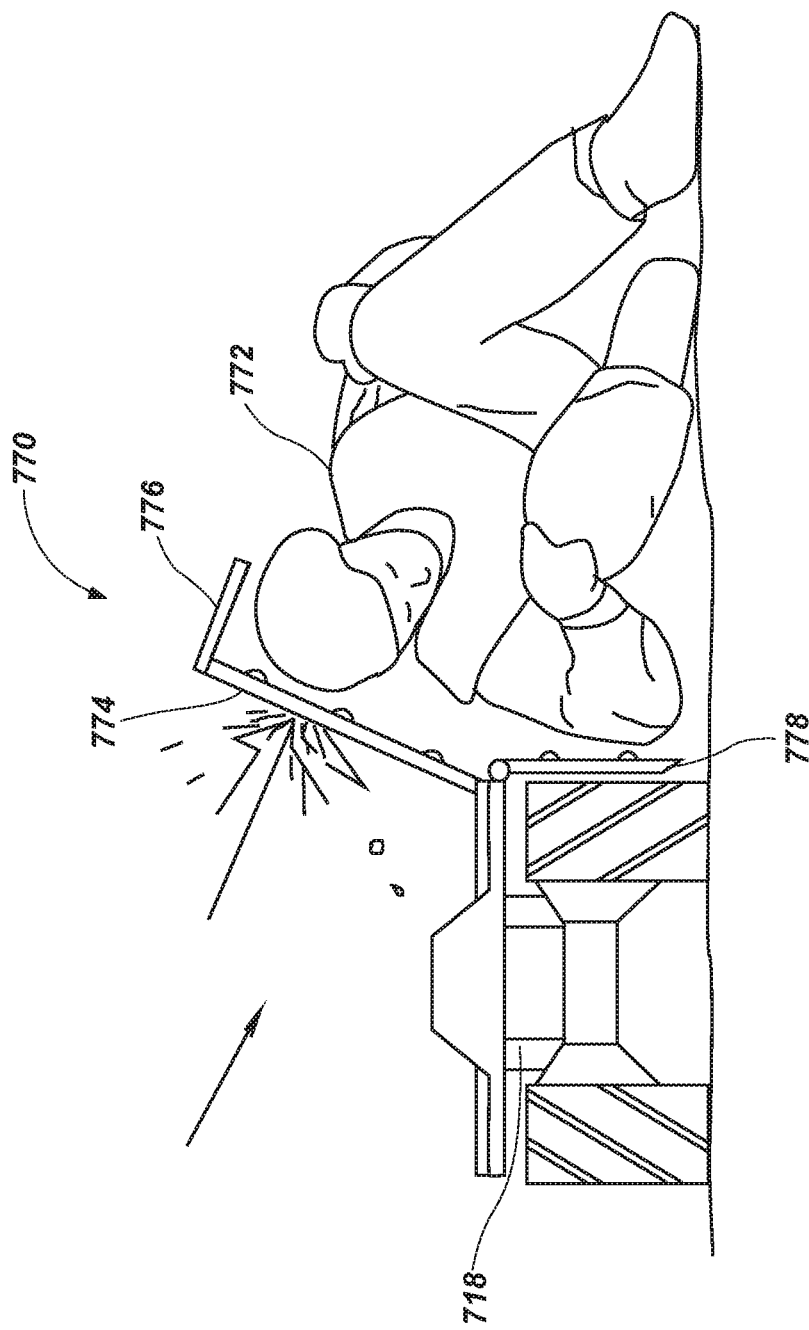
FIG. 10 illustrates an armored payload module in accordance with an exemplary embodiment of the present invention.

In another exemplary embodiment of a payload module, FIG. 10 illustrates payload module 770 in the form of an armored payload module that can function as a barricade, and more particularly as a mobile barricade, for a soldier, for example, against enemy fire. The armored payload module 770 can be constructed of steel or other materials that can provide an effective barrier to small arms projectiles and/or shrapnel. The armored payload module 770 can include an armored primary portion 774 that can be moved into a defensive position for the soldier 772. An armored side portion 776 can act as an overhead barrier for the soldier 772. In the embodiment shown, the armored payload module 770 can perform dual functions. For example, the armored primary portion 774 can act as a platform for carrying a load when in a horizontal position over the frame 718. Additionally, armored side portion 776 can act as a sidewall for the platform to prevent the load from sliding off the platform during transit. In another aspect, a second armored side portion 778 can fold down to allow movement of the armored primary portion 774 into the defensive position for the soldier 772. Thus, the armored payload module 770 can function as a load carrying platform as well as a mobile barricade.

In yet another embodiment, an armored portion can be removably attachable to one or a plurality of transport modules, and can be selectively placed in an area or configuration of greatest benefit to a soldier. For example, an armored portion can be configured to comprise a plate-like structure that can be supported in an upright position about the transport module(s) and/or any existing payload module. The armored portion can be selectively deployed by an individual, and can be sized and configured as necessary.

Figure 11:
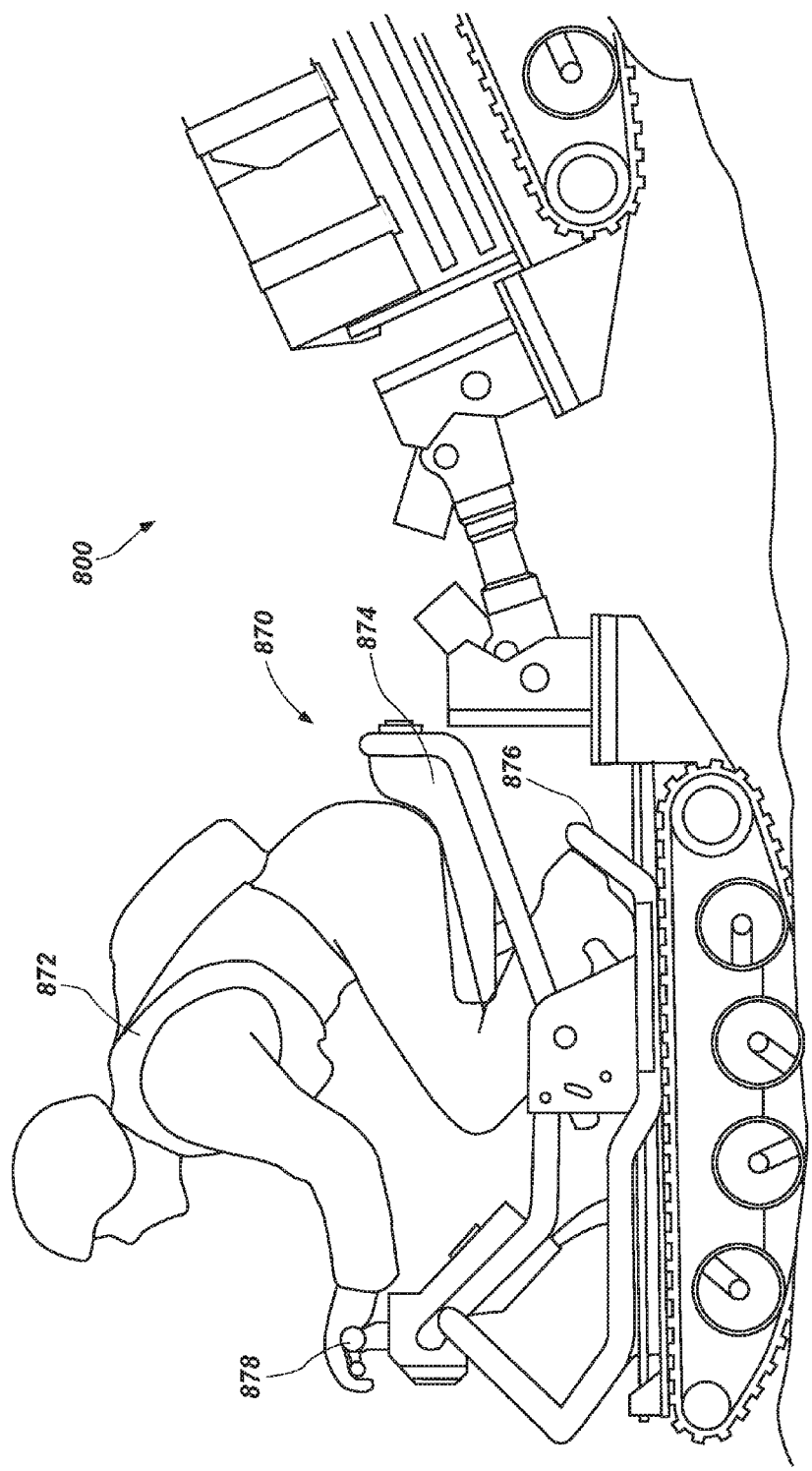
FIG. 11 illustrates a personnel transport payload module in accordance with an exemplary embodiment of the present invention.

Payload modules can also be configured to transport personnel. For example, as illustrated in FIG. 11, an operator payload module 870 can be configured to carry an individual or operator 872 of the low-profile transport vehicle 800. In this embodiment, the personnel transport payload module 870 can be equipped with a seat 874, footrest 876, and an operator interface 878, which can include a handle, a throttle control, a brake control, etc. This can allow the operator 872 to steer and control the direction and speed of the associated transport module and the low-profile transport vehicle 800, or the individual transport module if decoupled from other transport modules.

Figure 12:
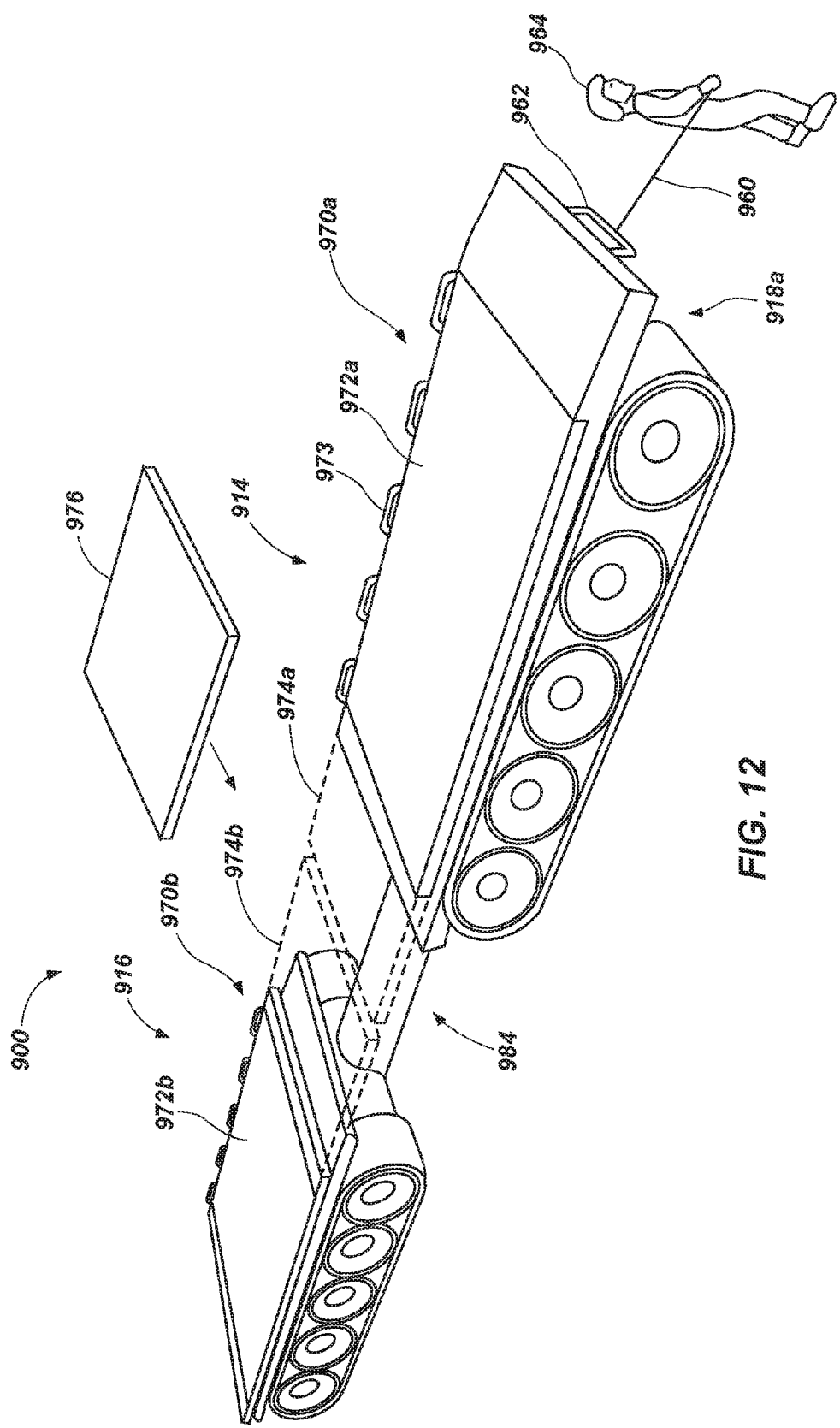
FIG. 12 illustrates a robotic mobile low-profile transport vehicle configured for medevac operations in accordance with an exemplary embodiment of the present invention.

In another example, as illustrated in FIG. 12, a medical evacuation (medevac) payload module 970a can be configured to transport injured personnel in medevac operations. For example, the medevac payload module 970a can include a platform 972a that can be configured to accommodate an injured person. In one aspect, the platform 972a can be removably supported about the frame assembly 918a of transport module 914, such that the platform 972a can be selectively removed to function or serve as a stretcher to transport the injured person to the vehicle 900, wherein the platform 972a is again coupled or otherwise secured to the frame assembly. Handles 973 can be included to provide medical personnel with a convenient hold for grasping and manipulating the platform 972a while transporting the injured person to the vehicle 900.

In another aspect, the transport module and/or the platform 972a may not be sized to adequately receive or fit an injured person. In this case, an extension member 974a can be provided, wherein the extension member 974 can be operable with the platform to extend from an end of the platform 972a (e.g., along a rail system (not shown)) to provide additional length to the platform to accommodate the injured person. If the platform 972a and extension member 974a are not long enough to fit an injured person, platform 972b can also be operable or equipped with an extension member 974b. Both extension members 974a-b can extend toward one another between the transport modules 914, 916, and over the coupling assemblage. In one aspect, the extension members 974a-b can meet and/or couple with one another.

Alternatively, a bridge member 976 can be coupled to and between adjacent transport modules and/or their associated platforms 972a-b, wherein the support member works in conjunction with the adjacent platforms of the transport modules to provide a support system capable of receiving and accommodate an injured person on the vehicle 900. The bridge member 976 can be a rigid structure, such as a panel, or a flexible structure, such as a net or webbing.

Generally speaking, the extension members 974 and the bridge member 976 may be configured to span the gap between transport modules and their associated platforms as extended between them. Moreover, these can be configured to be supported above the coupling assemblage joining the adjacent transport modules and their associated platforms. As such, the coupling assemblage can be configured to comprise a low-profile design that is below a surface of the platforms of the various transport modules, thus providing a space for the extension members 974 or the bridge member 976 to be coupled or supported in an elevated position above the coupling assemblage (e.g., see the low-profile coupling assemblages shown in FIG. 5, FIG. 7A, or FIG. 12). In this configuration, the coupling assemblage may be operated, at least in some capacity, so as not to interfere with the extension members 974 or the bridge member 976.

In the case of a bridge member 976 or extended extension members 974a-b being deployed and used to support an individual (or other payload), the coupling assemblage can be controlled or configured to prevent contact with and damage to the bridge member 976 or extension members 974a-b during transit, as well as to protect the individual (or load) being transported. For example, all or parts of the coupling assemblage 984 can be locked to allow the two transport modules 914, 916 to act more like a single unit.

In one aspect, the medevac elements and components of a payload module, as discussed above, can be incorporated into a low-profile transport vehicle in a non-modular or permanent manner. In other words, a transport module and/or an entire vehicle can be configured for dedicated medevac operations or support. For example, a dedicated medevac vehicle can include platforms and/or extension members that function similar to platforms 972a-b and/or extension members 974a-b, but that are a part of a fixed or non-removable platform (i.e., not part of a payload module), such as that shown in FIG. 1. Similarly, a dedicated medevac vehicle can include a bridge member similar in function to bridge member 976 that can be configured to span a gap between transport modules. Additionally, a dedicated medevac transport module and/or vehicle can include a platform that can be removable to function as a stretcher.

Illustrated in FIGS. 13A and 13B is a low-profile transport vehicle 1000 with payload modules 1070a, 1070b, 1070c each removably coupled to transport modules 1071a, 1071b and 1071c, respectively. In this configuration, the low-profile transport vehicle 1000 can be configured to transport and launch a missile. As shown, payload modules 1070a and/or 1070c can be configured as a missile launch support module and/or as a communications payload module with communications hardware (such as antennas 1072a, 1072c), guidance hardware and related electronics to facilitate targeting and launching a missile, such as an antitank missile, carried by missile launch payload module 1070b. The payload module 1070b can therefore serve as the actual launch platform for the missile, wherein the payload modules are all in communication with one another to effectuate launch of the missile supported about payload module 1070b.

Payload modules 1070a and 1070c can further comprise one or more articulated arms, such as articulated arms 1074a, 1074c, respectively, which can be used to assist in properly positioning the payload module 1070b, the associated transport module, and ultimately the missile, for launch. For example, as seen in FIG. 13B, transport modules 1071a and 1071c can move toward one another and utilize the coupling assemblages 1084a, 1084b in order to elevate transport module 1071b into an appropriate missile launch angle. Articulated arms 1074a, 1074c can be rotated about the frame assembly of the transport module to anchor the low-profile transport vehicle 1000 to the ground to provide a stable launch platform and to assist in providing a suitable launch platform that can withstand the forces associated with a missile launch. In another aspect, articulated arms 1074a, 1074c can be articulated or rotated as needed to provide or assist in locomotion of the vehicle 1000, such as to climb or scale various obstacles (e.g., stairs, rocks, etc.). The payload module(s) can further comprise a deflector plate 1076, which can be incorporated to shield or deflect exhaust gasses from a missile when launched. Furthermore, antennas 1072a, 1072c can be used for communications and to target the missile being launched from the payload module 1070b. Due to the ability of the plurality of transport modules to be reconfigured about one another in a variety of configurations as a result of the multi-degree of freedom coupling assemblage and the articulating arms, a variety of platform modules may be configured with the needed components and removably coupled to the low-profile transport vehicle 1000, such that it can therefore be used to set up and launch a missile on uneven terrain. In one aspect, payload modules 1070a and 1070c can comprise any type of payload module discussed herein.

Based on the above discussion, it should be recognized that a payload module can be configured for any mission or application. For example, a payload module can be in the form of a robotic arm payload module that is equipped with one or more robotic arms, which can be used to deploy, manipulate, and/or retrieve objects (e.g. sensor network nodes, explosives, breaching tools, designators, relay nodes, etc.). In another example, a payload module can be configured as a camera and/or sensor payload module and can include an actuated camera mount, which can be used to navigate the low-profile transport vehicle and/or can be remotely controlled to aid in surveillance. In yet another example, a payload module can be configured as a power payload module and/or a battery recharge payload module and can be equipped with a battery recharging station that can be used by soldiers to recharge batteries normally carried by soldiers. Battery recharging can take place while the low-profile transport vehicle is stationary or in transit to a destination. In other words, a low-profile transport vehicle can function as a portable power source. The power can be produced by a generator, e.g., an internal combustion engine, or the payload module can be configured to capture power from the environment, such as wind or solar power. In still another example, a payload module can be configured as a medical support payload module and can include emergency medical equipment, such as a defibrillator, and can include health monitoring capabilities. Thus, a low-profile transport vehicle can include one or more payload modules configured to sustain troops, perform logistics support operations, and a variety of other tasks. Indeed, the scalable and reconfigurable aspects of the low-profile transport vehicle allow it to be adapted to satisfy a broad range of missions, such as logistics, sustainment, agile combat support, personnel transport, increased firepower, and others.

Figure 14:
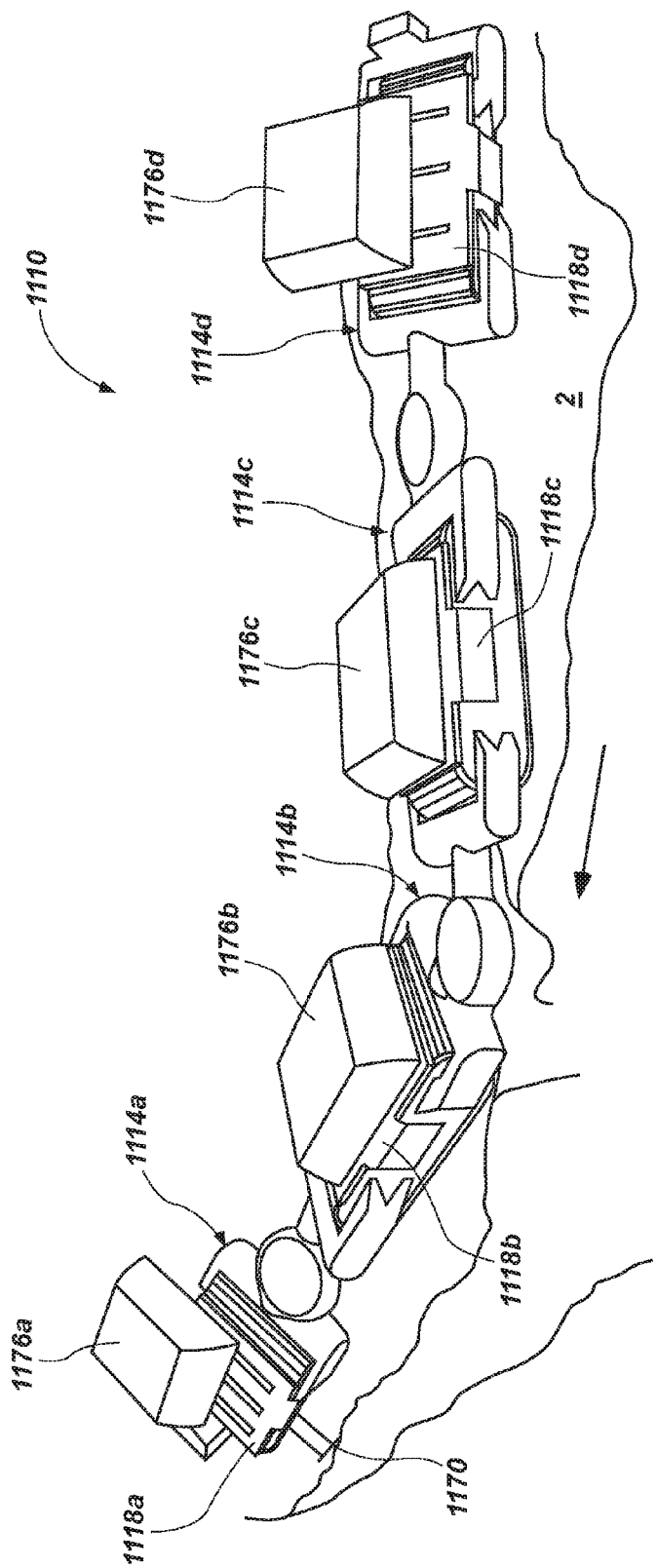
FIG. 14 illustrates a perspective view of a robotic mobile low-profile transport vehicle formed in accordance with another exemplary embodiment, wherein the vehicle comprises a plurality of transport modules joined in a tandem configuration, wherein the vehicle is in an operational mode and is being caused to traverse uneven terrain, and wherein the platforms of the various vehicles are caused to translate in a lateral direction to improve the stability of the vehicle as it traverses the ground surface.

FIG. 14 illustrates a low-profile transport vehicle configured in accordance with still another exemplary embodiment of the present invention. In this embodiment, the low-profile transport vehicle 1110 comprises four transport modules (see transport modules 1114a, 1114b, 1114c, 1114d) joined together via respective coupling assemblages. The low-profile transport vehicle 1110 is shown traversing in a direction of travel indicated by the arrow over a ground surface 2 having uneven or complex terrain. The first or leading transport module 1114a comprises a moveable or translating platform 1176a that is shifted to the right relative to the frame assembly 1118a in an effort to stabilize the transport module 1114a as it is traversing uneven ground causing the transport module to be on an incline. Likewise, the trailing or end transport module 1114d also comprises a translating platform 1176d that is shifted to the right relative to the frame assembly 1118d as it is also traversing uneven ground causing the transport module to be oriented on an incline. The intermediate transport modules 1114b and 1114c also comprise moveable or translating platforms 1176b and 1176c, respectively, but these are positioned in a default or neutral (i.e., non-shifted) position as they are traversing substantially flat terrain. The shifting of the platforms 1176a and 1176d alters or shifts the center of mass of the associated transport modules, thus reducing the likelihood of tipping, as discussed herein.

Transport module 1114a can also include a stabilizer bar 1170 that can be deployed (e.g., actuated to extend) from a side of the transport module 1114a. The stabilizer bar 1170 can be deployed to provide a mechanical support for the transport module 1114a to contact the ground surface 2 and prevent the transport module 1114a from tipping or rolling over. In one aspect, the stabilizer bar 1170 can be deployed once the transport module 1114a has tipped over in order to self-right the transport module. For example, the stabilizer bar 1170 can contact the ground and force the transport module 1114a into an upright position. Providing a plurality of transport modules having translating platforms and/or a stabilizer bar in a low-profile transport vehicle can therefore provide the vehicle with an additional degree of freedom that is available during operation, and that can be used in an effort to stabilize any one of the transport modules, or the overall vehicle itself, to achieve the optimal vehicle configuration for traversing a particular terrain. The stabilizer bar 1170 may be equipped with a wheel or other mobility device to allow it to traverse the ground upon coming in contact with the ground.

Figure 15:
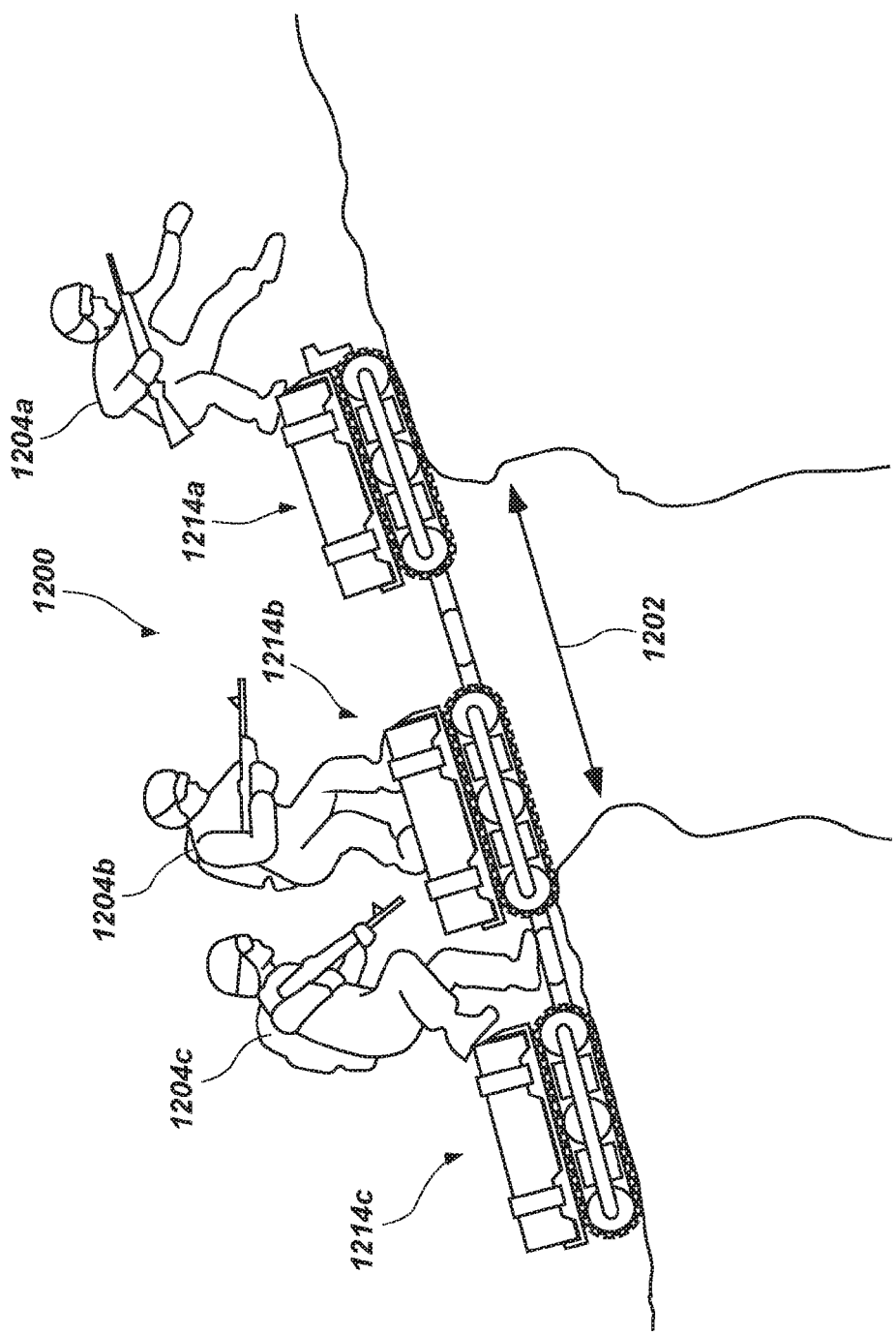
FIG. 15 illustrates a robotic mobile low-profile transport vehicle configured as a bridge in accordance with an exemplary embodiment of the present invention.

FIG. 15 illustrates a low-profile transport vehicle configured in accordance with yet another exemplary embodiment of the present invention. In this embodiment, the low-profile transport vehicle 1200 comprises three transport modules (see transport modules 1214a, 1214b, 1214c) joined together via respective coupling assemblages. The low-profile transport vehicle 1200 is shown in a bridge configuration, with transport module 1214a on one side of a gap 1202 and with transport module 1214c on an opposite side of the gap 1202. The coupling assemblages can be locked up to prevent relative movement between the transport modules, and to provide a suitable rigid system to enable the vehicle to function as a bridge. In the bridge configuration, one or more individuals 1204a, 1204b, 1204c can use the low-profile transport vehicle 1200 to cross the gap 1202.

Figure 16:
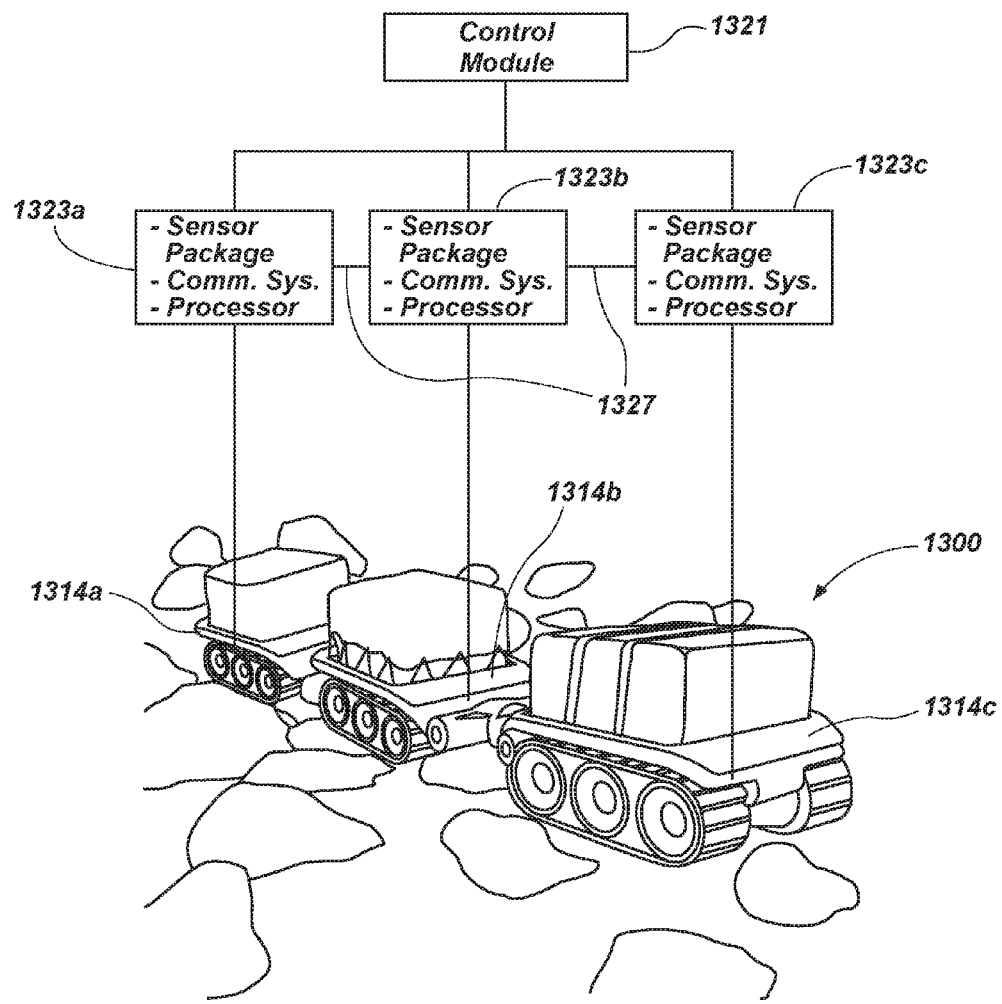
FIG. 16 illustrates a perspective view of a robotic mobile low-profile transport vehicle formed in accordance with another exemplary embodiment, wherein the vehicle comprises three transport modules in operation about an uneven ground surface, and wherein each transport module comprises sensing and intra-module communication capabilities as the vehicle traverses the ground surface.

FIG. 16 illustrates a perspective view of a robotic mobile low-profile transport vehicle formed in accordance with another exemplary embodiment, wherein the vehicle comprises three transport modules in operation about an uneven ground surface. The low-profile transport vehicle 1310 comprises a first, leading transport module 1314a and second and third trailing modules 1314b and 1314c, these being joined to one another by multi-degree of freedom coupling assemblages. The order of the transport modules may be reversed of course should the vehicle 1310 be driven in a reverse or an opposing direction, with the third, trailing transport module becoming the lead transport module.

In operation, the various transport modules 1314 *a-c* of the low-profile transport vehicle 1310 may be controlled via a control system capable of providing optimal vehicle operating modes and configurations for different types of terrain, and from one point to another. In one exemplary embodiment, the control system operates to facilitate intra-module communication and coordination to provide an optimal configuration and operating mode of the various transport modules and coupling assemblages about a given terrain. The control system can be configured to receive information and data from one or more of the various transport modules, each of which can receive information from any other transport module, and transmit various instructions or commands based on a desired operating scenario.

Some embodiments include sensing (including real-time sensing) a variety of things during operation of the low-profile transport vehicle, such as environmental conditions, environmental objects, ground surface variations, operator presence, presence of other operating transport modules, orientation of operating transport modules, motion of transport modules, assemblage conditions and modes, and other parameters or elements for a variety of purposes, including placing the low-profile transport vehicle 1310, as a whole, or in part, in a suitable and efficient operating mode to traverse a particular ground surface 2. As part of this, the low-profile transport vehicle 1310 may be configured to provide intra-module communication and coordination, wherein the transport modules 1314 *a-c* may convey sensed and other information back and forth with each other, and with a control module 1321 that provides the control logic for operating the low-profile transport vehicle. For example, the transport modules of the low-profile transport vehicle can act cooperatively by deriving compensating torque from one or more adjacent modules through an "intelligent" coupling between transport modules to augment the system's stability and allow it to maneuver in very complex terrain. In one aspect, two transport modules can each have at least one sensor, and information obtained from one sensor can be conveyed back and forth between the transport modules by the control system. The control system is intended to control all of the components of the vehicle, and to coordinate the functionality of these during operation.

An on-board central processor, a distributed network of controllers for each DOF of the coupling assemblage, and sensor signal conditioning modules can be used to implement high level control policies and high bandwidth individual DOF control policies. A modular control network architecture can utilize an array of distributed modules comprising an interface and communication board (ICB) that can include a microprocessor used to implement local control, signal processing firmware, and network communication, and an application-specific board (ASB) tailored to condition signals from sensors, drive valves, and other similar functions. In one aspect, the modular network architecture can allow devices and subsystems to be easily added or removed.

A micro-computer, such as a PC-type processor, can perform the function of central controller and can be used to implement high level control policies on-board the low-profile transport vehicle itself, thereby significantly reducing the communication bandwidth requirements between the vehicle and an operator control station (OCS), as well as enabling semi-autonomous behavior of the vehicle.

The OCS can be configured to allow an operator to control the low-profile transport vehicle (e.g., remotely), for example, to set-up control parameters and modes of operation and to monitor operation of the vehicle. The OCS can also monitor and control a sensor mounted on the vehicle, such as a camera and camera mount control. The OCS can be in wired or wireless communication with the vehicle. The OCS can include a joystick, mouse, keypad, display, touchscreen, or any other form of user/computer interface. In one aspect, the OCS can comprise a laptop, smart phone, or tablet computer. In another aspect, the OCS can comprise a replica master of all or a portion of the vehicle to allow an operator to manipulate or control the vehicle, and/or a non-kinematically equivalent input device. An OCS can display video images, present system status information, and other data obtained from on-board sensors, such as vehicle orientation, location. In one exemplary embodiment, a graphical user interface can include an avatar of the vehicle with superimposed operational status information, ground contact force distribution, etc.

In one exemplary embodiment, a compact wearable OCS can be donned by an operator and can include a combined miniature replica master and a non-kinematically equivalent master. This OCS can be configured to wirelessly communicate with the vehicle and can permit the operator to switch between various modes of vehicle operation, such as teleautonomy, supervised autonomy, follow-the-leader and other available modes of operation, some of which are discussed further hereinafter.

Communication, both internal and external to the low-profile transport vehicle, can include RF wireless, high bandwidth digital radio, free-space optical, fiber-optics, and/or wired communication channels. In one aspect, a wireless communication link can be provided for transmitting data between the low-profile transport vehicle and the OCS. The low-profile transport vehicle can be equipped with communication capabilities appropriate for the intended use and/or specific missions or tasks. For example, data used for remote control, image data, video data, audio data, sensor data (e.g., GPS data, on-board environmental sensor data, and surveillance data), and/or communication relay data (e.g., for vehicle to vehicle communication/control, for extending the range of voice/data communication over terrain beyond the line of sight range, and communication with other UAS systems) can be transmitted and/or received by the low-profile transport vehicle.

Data communication system equipment can be easily replaceable, "plug- and play" type functional modules. In one aspect, as illustrated in FIG. 5, the low-profile transport vehicle can be equipped with a sealed, but easily accessible bay 270 for inserting the data communication system 274, wherein a power, data, and/or control connection 276 between on-board control systems, a radio, and/or an antenna can be provided and supported in the vehicle. Antennas can be foldable or retractable, and can be mounted on the vehicle. The interchangeability and upgradeability of the data communication system equipment can allow the low-profile transport vehicle to be integrated with existing and future infrastructure (e.g., unmanned air systems) and can allow the vehicle to participate as a team member in task-based operations concurrently conducted by a team of individuals and machines.

With respect to the various embodiments of a low-profile transport vehicle as discussed herein, a variety of sensor types are contemplated for use within the low-profile transport vehicle. Each transport module, and the associated coupling assemblages, may comprise a plurality of sensors and sensor types (a sensor package) depending upon the particular need or intended operating mode intended for the low-profile transport vehicle. The sensors or sensor package in each of the transport modules may be different or the same. In one aspect, sensors used for control of the vehicle can include coupling assemblage joint position and force-moment sensors, IMU (orientation and acceleration sensor), GPS, and/or under-track multi-axis force-moment sensors.

Sensor types include, but are not limited to, acoustic, vibration, transportation, vehicle, chemical, electric current, electric potential, magnetic, radio, environmental (weather, humidity, temperature, etc.), fluid, fluid flow, ionising radiation, subatomic particle, navigation, position, angle, displacement, distance, speed, acceleration, optical, light, imaging, pressure, force, density, thermal, proximity sensor for balance and operation in tight spaces, presence, and combinations of these sensor types.

In addition, various sensor technologies may be employed, such as LIDAR (optical remote sensing technology), active pixel, machine vision, biochip, biosensor, capacitance probe, catadioptric sensor, carbon paste electrode, displacement receiver, electromechanical film, electro-optical sensor, fabry-Pérot interferometer, image sensor, inductive sensor, intelligent sensor, lab-on-a-chip, leaf sensor, micro-sensor arrays, RADAR, sensor array, sensor grid, sensor node, soft sensor, SONAR, staring array, transducer, ultrasonic sensor, video sensor, visual sensor network, Wheatstone bridge, photoelasticity, video, NVGC SWIR, and IR cameras mounted on gimbals, attached to appendages on the vehicle, or mounted directly to the vehicle, ground penetrating radar, CBRNE sensors, seismic sensors, and any combination of these technologies.

Referring back to FIG. 16, the transport modules 1314 *a-c* each may comprise an on-board control system comprising various components. For example, the control system for each transport module may comprise an on-board communication system that allows any one transport module to communicate with any other or groups of other transport modules, as well as with the control module 1321 (e.g., OCS), which may be located in a remote location, or on each of the transport modules. Furthermore, the control system may comprise an on-board processor that receives the signals from the sensors and processes these into usable data. The on-board control systems of the various transport modules are represented graphically in FIG. 16. Indeed, the first transport module 1314*a* may comprise a control system 1323*a*, the second transport module 1314*b* may comprise a control system 1323*b*, and the third transport module 1314*c* may comprise a control system 1323*c*.

It is contemplated that each of the transport modules may be controlled in concert with one another, or individually, such as when separated from adjacent transport modules, or individually while also joined with adjacent transport modules. The low-profile transport vehicle of the present invention may be operated in a number of different control modes as part of an overall control scheme (e.g., one consisting of both unitary and division control). Architecture and software code can implement perception, path planning, and path following algorithms. In one example, the lead transport module may be configured to convey information about an encountered object or terrain to the individual trailing modules so these may be more optimally configured to more efficiently traverse the object or terrain once encountered. At a basic level, controls can be applied to control coupling assemblage joint position and torque (e.g. position control with variable compliance).

The low-profile transport vehicle control system can allow an operator to command the vehicle using several modes of operation. In one aspect, compact input devices, such as multi-axis joysticks, can be used in conjunction with movement primitives to operate the vehicle in a direct system teleoperation mode. In this mode spatiotemporal coordinated joint commands can be generated in response to very simple commands received from the input device. For example, while using a "follow-the-head" mode, coordinated movement primitives and the operator's use of the input device (i.e., joystick) can control the trajectory of the lead transport module (the head), and commands for the coupling assemblage that enable the remaining coupled transport modules to follow the path of the lead transport module can be automatically generated. Movement primitives or reflexes can include stability control (anti-roll), traction control, and roll-over recovery. In a specific example, as illustrated in FIG. 12, a human interface device, such as a physical tether 960, a retractable leash, etc. can be coupled to the vehicle via a force-moment sensor 962 at one end, and to the operator 964 at an opposite end. The force-moment sensor 962 can receive input used to determine a direction of travel for the low-profile transport vehicle. For example, the operator 964 can apply a force to the tether 960 in a desired direction of travel and the force-moment sensor 962 can be used to determine the direction the operator 964 wishes to direct the vehicle. To improve performance, a multi-axis force-moment sensor, such as a six-axis sensor, can be used. Alternatively, rather than using a tether or a leash, other types of human interface devices can be used, such as a handle.

In another aspect, a teleautonomy mode can be used to operate the low-profile transport vehicle. Teleautonomy mode is a generalized form of teleoperation, where movements and behavior primitives (autonomic or reflex-like responses), such as traction augmentation, self-stabilization (to prevent or minimize the risk of vehicle roll-over, such as payload shifting or shape change for stability), and collision-avoidance can be used to reduce the level of effort required from the operator during teleoperation. With teleautonomy, the operator can still operate the vehicle, but several autonomous commands (reflex-like or learned series of coordinated movements) can be superimposed onto the operator's commands to facilitate operation of the vehicle. Learning control policies can be used to allow new behavior to be learned or reinforced by example and also to adapt and compensate, in real-time, for the variations in the transport module and coupling assemblage dynamic. Using a relay, such as a UAV, a low-profile transport vehicle can be operated from a remote location.

In yet another aspect, a supervised autonomy mode can be used to operate the low-profile transport vehicle where the operator can determine a path and speed, and then provide only intermittent commands to a vehicle (e.g., in case of emergency or in ambiguous situations) that can operate mostly autonomously. A path can be determined by designating way-points (e.g. using a combination of GPS, laser guiding, and/or topological coordinates), terrain features, and/or other parameters. Simultaneous Localization and Mapping (SLAM) algorithms and computationally efficient LIDAR-less methods can be used to record the path being followed by the vehicle or to ensure that the vehicle is following the planned path. This can also provide a mechanism to recover from faults or malfunctions, such as loss of communication, while the system is operating in any of its primary modes, and a way to allow the vehicle to operate autonomously for some period of time (e.g., while traversing a tunnel, and other situations where the communication channel is unstable or breaks down entirely). SLAM algorithms can also be implemented to localize and map the operational space of the vehicle. Computation complexity can be streamlined through state augmentation, selective updating and disposal of landmarks in the map database, and relative mapping of the vehicle with respect to the dynamic target coordinate frame. Inertial navigation can also be used. With minimal operator input typically required, the supervised autonomy mode can allow one operator to control or guide multiple vehicles.

In still another aspect, a follow-the-leader mode, or "guided autonomy," which is a subset of supervised-autonomy, can be used to operate a low-profile transport vehicle where one vehicle follows another vehicle or an operator according to user-specified rules and constraints. This mode can exploit human-like mobility of the low-profile transport vehicle in order to allow the vehicle to follow its guide and act as a "partner." The follow-the-leader mode can also be useful in establishing convoys where the lead vehicle may be teleoperated while other vehicles follow, but with the option that any of these vehicles could be teleoperated on-demand in case of emergency. In the follow-the-leader mode, a vehicle can follow an operator or another vehicle while automatically adjusting its gait and behavior primitives to overcome obstacles encountered on the way. SLAM algorithms can also be used for the follow-the-leader mode. In one aspect, a marker, a beacon, a GPS receiver, inertial navigation package, and/or a camera-based vision system can be mounted on the operator, such as on a waist belt. These devices can be used to allow easy detection of the operator by the vehicle to allow the vehicle to follow the operator's movements and path and to receive advanced information about key terrain features and obstacles (i.e., stairs, large rocks, etc.). The follow-the-leader mode can allow one operator to control or guide multiple vehicles. In another aspect, the follow-the-leader mode can allow groups of one or more transport modules to follow different operators as a low-profile transport vehicle is separated into smaller groups of transport modules or individual units.

In one aspect of the invention, the low-profile transport vehicle and/or the OCS can be configured to allow the system to be controlled or operated using human voice commands. In another aspect, the low-profile transport vehicle can be equipped with sensors, control algorithms, and software that can allow the vehicle to be controlled or operated using human gestures.

Control policies and related software and firmware can therefore be extended to facilitate the operation of the vehicle by providing supervised autonomy capabilities that include real-time creation and following of smooth paths by designating waypoints and specifying constraints (e.g., maximum speed, terrain features, etc.), and a follower mode that can combine terrain and path information gathered by the operator or other vehicles from sensors. For example, on-board perception sensors and algorithms can be used to detect and process terrain features in order to allow the vehicle to follow a dismounted operator or other vehicle with little or no intervention from the operator. Control policies can also augment system recovery from faults and malfunctions (e.g. path record and retrace in the event of malfunction), implement behavioral primitives for teleautonomy that can include roll-over minimization and automatic roll-over recovery, traction control, stable operation in presence of external perturbations (e.g. being pushed by an operator), obstacle detection and collision avoidance, and other simple behaviors.

It is noted herein that the control modes discussed above may be initiated or employed in accordance with an overall control scheme comprising the higher-level unitary or division modes, as also discussed above. In addition, those skilled in the art will recognize that other control modes may be implemented, and that those discussed herein are not intended to be limiting in any way.

Figure 17:
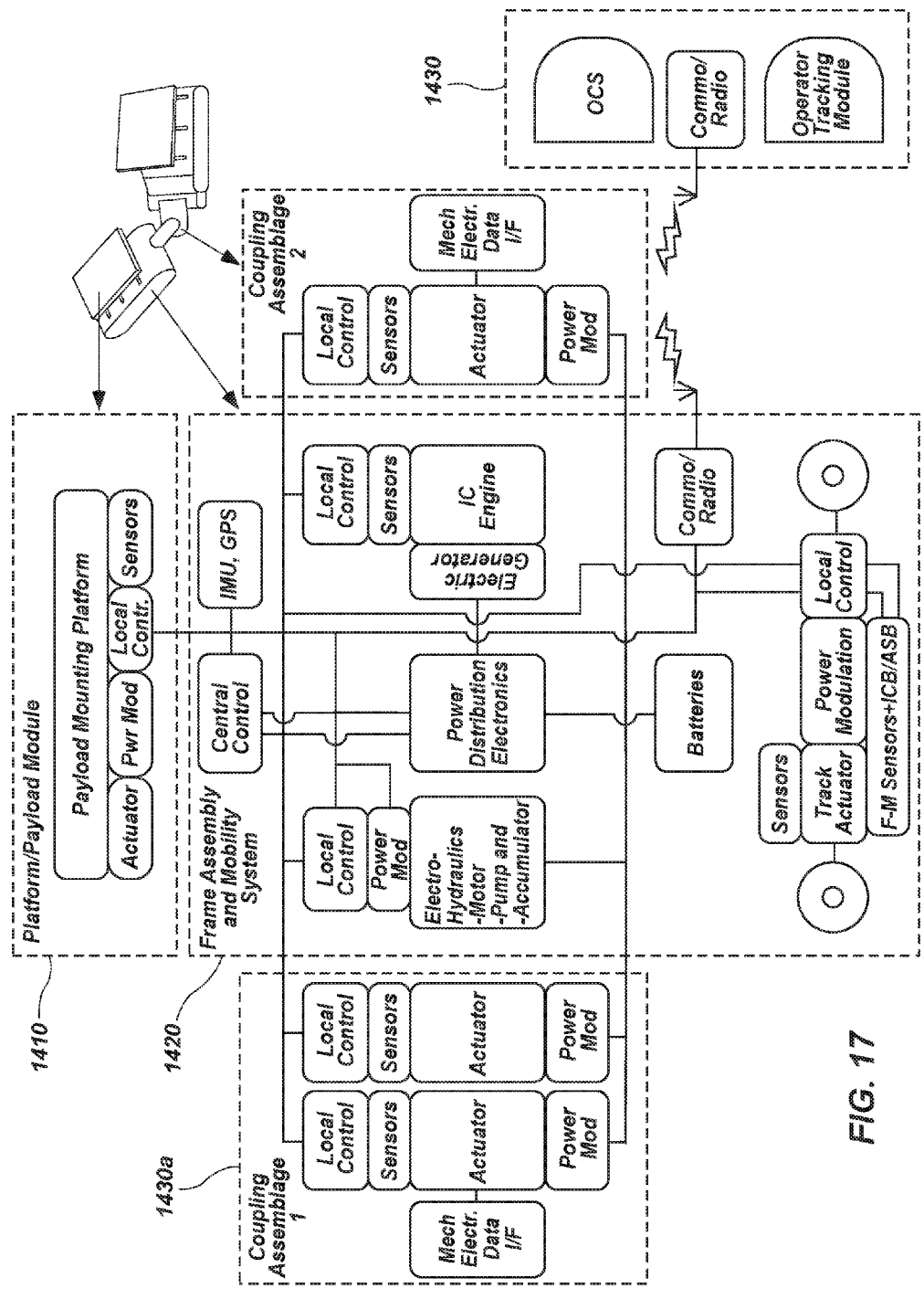
FIG. 17 illustrates a schematic diagram of interconnections of a low-profile transport vehicle in accordance with an exemplary embodiment of the present invention.

With reference to FIG. 17, illustrated is a schematic diagram of various interconnections of an exemplary low-profile transport vehicle. Interconnections between a platform or payload module 1410, a frame assembly and mobility system 1420, a first coupling assemblage 1430a, a second coupling assemblage 1430b, and an operator control system 1430 are shown. In particular, interconnections between power supply, power storage, and power distribution control are illustrated as well as interconnections between sensors, system control, and actuators. In addition, communication with the operator control system 1430 is illustrated. In one aspect, a modular control network architecture is illustrated wherein a central control can identify the presence or absence of local controls within the system. In this way, the modular control network architecture can enable execution of a control scheme that is switchable between a unitary mode and a division mode, as discussed herein. Similarly, the modular control network architecture can also enable integration of new or different payload modules, as discussed herein, into the control system.

In accordance with one embodiment of the present invention, a method for facilitating operation of a robotic low-profile mobile transport vehicle is disclosed. The method can comprise providing a robotic low-profile mobile transport vehicle, comprising a first transport module having a frame assembly, a mobility system, and a propulsion system, a second transport module having a frame assembly and a mobility system, a multi-degree of freedom coupling assemblage joining said first and second transport modules together, and a first platform supported about said frame assembly of said first transport module, and a second platform supported about said frame assembly of said second transport module, each of said platforms being configured to receive a load for transport. Additionally, the method can comprise facilitating intra-module communication and coordination with a control system to provide a coordinated operating mode of said first and second transport modules and said coupling assemblage about a given terrain.

In accordance with another embodiment of the present invention, a method for facilitating operation of a robotic low-profile mobile transport vehicle is disclosed. The method can comprise providing a robotic low-profile mobile transport vehicle, comprising a first transport module having a frame assembly, a mobility system, and a propulsion system, a second transport module having a frame assembly and a mobility system, and a multi-degree of freedom coupling assemblage joining said first and second transport modules together. The method can also comprise facilitating selective coupling and decoupling of the first transport module from the second transport module utilizing an interconnect system operable with the coupling assemblage. Additionally, the method can comprise facilitating switching between a unitary mode and a division mode with a control scheme operable to control operation of the robotic low-profile transport vehicle, wherein, in the unitary mode, the control scheme facilitates coordinated control across the first and second transport modules and the coupling assemblage when coupled, and wherein, in the division mode, the control scheme facilitates independent operation of the first and second transport modules when decoupled.

In accordance with yet another embodiment of the present invention, a method for facilitating enhanced stability of a robotic transport module operable within a mobile low-profile transport vehicle is disclosed. The method can comprise providing a transport module, comprising a frame assembly, a mobility system supported about said frame assembly, and configured to facilitate movement of said transport module, and a platform configured to receive a load, said platform being supported by and moveable about said frame assembly. Additionally, the method can comprise facilitating active, actuated translation of said platform in at least one degree of freedom about said frame assembly utilizing a translation system, wherein said translation system operates to alter a center of mass of said transport module to enhance stability of said transport module during operation.

In accordance with still another embodiment of the present invention, a method for facilitating interchanging of a payload on a transport module operable within a mobile low-profile transport vehicle is disclosed. The method can comprise providing a robotic transport module, comprising a frame assembly, and a mobility system supported about said frame assembly, and configured to provide movement to said transport module. Additionally, the method can comprise facilitating removable coupling of a payload module with the transport module utilizing an interchange interface.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. Accordingly, the scope of the invention should be determined solely by the appended claims and their legal equivalents, rather than by the descriptions and examples given above.

What is claimed is:

1. A robotic transport module operable within a mobile low-profile transport vehicle, said transport module comprising:

a frame assembly;

a mobility system supported about said frame assembly, and configured to facilitate movement of said transport module;

a platform configured to receive a load, said platform being supported by and moveable in at least a lateral direction about said frame assembly;

a translation system configured to facilitate active, actuated translation of said platform in at least one degree of freedom about said frame assembly;

one or more sensors configured to detect a center of mass of said transport module, wherein said translation system operates to automatically alter the center of mass of said transport module, in response to information obtained by the one or more sensors, to enhance stability of said transport module during operation.

2. The transport module of claim 1, wherein said translation system comprises one of a chain drive system or a rack and pinion gearing system.

3. The transport module of claim 1, wherein said translation system is configured to operate to dynamically alter the center of mass of said transport module during operation of said transport module moving over irregular terrain.

4. A robotic mobile low-profile transport vehicle, comprising:
   a first transport module having a frame assembly, a mobility system, and a propulsion system;
   a second transport module having a frame assembly and a propulsion system
   a multi-degree of freedom coupling assemblage joining said first and second transport modules together;
   an interconnect system operable with the coupling assemblage to selectively couple and decouple the first transport module from the second transport module;
   a control system that operates to facilitate intra-module communication and coordination to provide a coordinated operating mode of said first and second transport modules and said coupling assemblage about a given terrain; and
   a control scheme operable to control operation of the robotic low-profile transport vehicle, and that is switchable between a unitary mode and a division mode, wherein, in the unitary mode, the control scheme facilitates coordinated control across the first and second transport modules and the coupling assemblage when coupled, and wherein, in the division mode, the control scheme facilitates independent operation of the first and second transport modules when decoupled.

5. The robotic mobile low-profile transport vehicle of claim 4, further comprising a first platform supported about said frame assembly of said first transport module, and a second platform supported about said frame assembly of said second transport module, each of said platforms being configured to receive a load for transport.

6. The robotic mobile low-profile transport vehicle of claim 5, wherein said platform is moveable in a lateral direction about the frame assembly and configured to receive a load for transport.

7. The robotic mobile low-profile transport vehicle of claim 6, further comprising a translation system configured to facilitate active, actuated translation or shifting of said platform about the frame assembly, wherein said translation system operates to adjust a center of mass of the transport module and an associated load to enhance stability of said transport module.

8. The robotic mobile low-profile transport vehicle of claim 4, further comprising a force-moment sensor to receive input used to determine a direction of travel for the low-profile transport vehicle, wherein the force-moment sensor is actuated via a human interface device.

9. The robotic mobile low-profile transport vehicle of claim 4, wherein said first and second transport modules each comprise at least one sensor, and wherein information obtained from said sensor is conveyed back and forth between said first and second transport modules by said control system.

10. The robotic mobile low-profile transport vehicle of claim 4, further comprising third and fourth transport modules joined together with the first and second transport modules via a plurality of multi-degree of freedom coupling assemblages, wherein the transport modules are removably coupleable to one another, and operate to decouple and operate in fully functional groups of at least two transport modules.

11. The robotic mobile low-profile transport vehicle of claim 10, wherein, in the division mode, the control scheme facilitates independent operation of each of the fully functional groups.

12. The robotic mobile low-profile transport vehicle of claim 11, wherein, in the division mode, the control scheme facilitates independent operation of each transport module within each of the fully functional groups.

13. The robotic mobile low-profile transport vehicle of claim 4, wherein, switching between the unitary mode and the division mode is automatic upon decoupling the first and second transport modules.

14. The robotic mobile low-profile transport vehicle of claim 4, wherein the control system comprises an on-board communication system coupled to each of the first and second transport modules, wherein switching between the unitary mode and the division mode is manually performed by an operator operating an operator control station (OCS) in communication with the on-board communication system.

15. The robotic mobile low-profile transport vehicle of claim 14, further comprising a camera sensor mounted to at least one of the first and second transport modules, wherein the camera sensor is configured to be controlled by the OCS.

16. The robotic mobile low-profile transport vehicle of claim 14, wherein the on-board communication system of each of the first and second transport modules is configured to be controlled by the OCS in at least one of a teleautonomy mode, a supervised autonomy mode, or a follow-the-leader mode.

17. The robotic mobile low-profile transport vehicle of claim 14, wherein each on-board communication system comprises a processor configured to receive and process signals from the OCS.

18. The robotic mobile low-profile transport vehicle of claim 4, wherein at least two additional transport modules are joined together with the first and second transport modules with a plurality of multi-degree of freedom coupling assemblages, and wherein, when in a follow-the-leader mode, one or more groups of transport modules are configured to follow different operators controlling a respective group of transport modules.

19. A method for operation of a robotic low-profile mobile transport vehicle, comprising:
   operating a robotic low-profile mobile transport vehicle, comprising
      a first transport module having a frame assembly, a mobility system, and a propulsion system,
      a second transport module having a frame assembly and a propulsion system
      a multi-degree of freedom coupling assemblage joining said first and second transport modules together, and
      an interconnect system operable with the coupling assemblage to selectively couple and decouple the first transport module from the second transport module,
      a control system that operates to facilitate intra-module communication and coordination to provide a coordinated operating mode of said first and second transport modules and said coupling assemblage about a given terrain; and switching between a unitary mode and a division mode with a control scheme, wherein, in the unitary mode, the control schemed facilitates coordinated control across the first and second transport modules and the coupling assemblage when coupled, and wherein, in the division mode, the control scheme facilitates independent operation of the first and second transport modules when decoupled.

20. The method of claim 19, wherein switching between the unitary mode and the division mode is automatic upon decoupling the first and second transport modules.

21. The method of claim 19, wherein switching between the unitary mode and the division mode is manually performed by an operator operating an operator control station (OCS) in communication with at least one of the first and second transport modules.

22. The method of claim 19, further comprising coupling third and fourth transport modules to the first and second transport modules with a plurality of multi-degree of freedom coupling assemblages, the method further comprising independently operating fully functional groups of at least two transport modules of the at least four transport modules.

23. The method of claim 22, further comprising individually operating each group of the fully functional groups of at least two transport modules.

* * * * *